(12) United States Patent  
Gomez et al.

(10) Patent No.: US 8,989,687 B2  
(45) Date of Patent: Mar. 24, 2015

(54) COMMUNICATION RECEIVER ENHANCEMENTS USING MULTI-SIGNAL CAPTURE

(75) Inventors: Ramon Alejandro Gomez, San Juan Capistrano, CA (US); Bruce J. Currivan, Dove Canyon, CA (US); Steven T. Jaffe, Irvine, CA (US); Loke Kun Tan, Newport, CA (US); Young Shin, Irvine, CA (US); Hanli Zou, Rancho Santa Margarita, CA (US); Lin He, Irvine, CA (US); Leonard Dauphinee, Irvine, CA (US); Thomas Joseph Kolze, Phoenix, AZ (US); Francesco Gatta, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 242 days.

(21) Appl. No.: 13/169,983

(22) Filed: Jun. 27, 2011

(65) Prior Publication Data

US 2012/0196551 A1    Aug. 2, 2012

Related U.S. Application Data

(60) Provisional application No. 61/437,263, filed on Jan. 28, 2011.

(51) Int. Cl.
*H04B 1/16* (2006.01)
*H04B 1/00* (2006.01)

(52) U.S. Cl.
CPC ............... *H04B 1/0003* (2013.01); *H04B 1/16* (2013.01); *H04B 1/3805* (2013.01)
USPC ...................... 455/251.1; 455/266; 455/343.1

(58) Field of Classification Search
USPC ............ 455/226.1, 226.2, 226.3, 230, 232.1, 455/255, 256, 266
See application file for complete search history.

(56) References Cited

U.S. PATENT DOCUMENTS 6,968,173 B2 * 11/2005 Cowley .................... 455/323
6,978,125 B2 * 12/2005 Lindell et al. .............. 455/183.1

(Continued)

FOREIGN PATENT DOCUMENTS

| CN | 1890911 A | 1/2007 |
| CN | 10146404 A | 4/2009 |
| WO | WO 03/015296 A1 | 7/2002 |

OTHER PUBLICATIONS

Office Action directed to related Chinese Patent Application No. 201210020339.9, mailed Mar. 3, 2014; 7 pages.

(Continued)

*Primary Examiner* — Blane J Jackson
(74) *Attorney, Agent, or Firm* — Sterne, Kessler, Goldstein & Fox PLLC

(57) ABSTRACT

A method and apparatus is disclosed to determine communications receiver parameters from multiple channels of a received communications signal and to configure and/or adjust communications receiver parameters to acquire one or more channels from among the multiple channels of the received communications signal. A communications receiver observes a multi-channel communication signal as it passes through a communication channel. The communications receiver determines one or more communications receiver parameters from the multiple channels of the received communications signal. The communications receiver configures and/or adjusts communications receiver parameters to acquire the one or more channels from among the multiple channels of the received communications signal.

26 Claims, 16 Drawing Sheets

(56) References Cited

U.S. PATENT DOCUMENTS

| | | | |
|---|---|---|---|
| 6,985,709 B2 * | 1/2006 | Perets | 455/266 |
| 7,085,539 B2 * | 8/2006 | Furman | 455/67.13 |
| 7,203,227 B1 | 4/2007 | Currivan et al. | |
| 7,286,606 B2 | 10/2007 | Maltsev et al. | |
| 7,522,885 B2 * | 4/2009 | Parssinen et al. | 455/67.11 |
| 7,522,901 B2 | 4/2009 | Dauphinee | |
| 7,639,998 B1 * | 12/2009 | Halvorson | 455/251.1 |
| 7,664,211 B2 * | 2/2010 | Solum | 375/345 |
| 7,680,215 B2 | 3/2010 | Lindoff et al. | |
| 7,701,978 B2 | 4/2010 | Kolze et al. | |
| 7,991,087 B2 * | 8/2011 | Solum | 375/345 |
| 2006/0111066 A1 | 5/2006 | Thorpe | |
| 2008/0096514 A1 * | 4/2008 | Rahman et al. | 455/307 |
| 2009/0239489 A1 | 9/2009 | Kaczman et al. | |
| 2010/0066917 A1 | 3/2010 | Gatta et al. | |
| 2010/0067630 A1 | 3/2010 | Gatta et al. | |

OTHER PUBLICATIONS

Office Action directed to related Chinese Patent Application No. 201210020339.9, mailed Aug. 20, 2014; 6 pages.

European Search Report from European Patent Application No. 12000189.6, dated Jul. 3, 2014, 6 pages.

* cited by examiner

COMMUNICATION RECEIVER ENHANCEMENTS USING MULTI-SIGNAL CAPTURE

CROSS-REFERENCE TO RELATED APPLICATIONS

The present application claims the benefit of U.S. Provisional Patent Appl. No. 61/437,263, filed on Jan. 28, 2011, which is incorporated herein by reference in its entirety.

BACKGROUND

1. Field of Invention

The present invention relates generally to a communication receiver and specifically to communication receivers using mixed-signals, namely analog and digital, technology.

2. Related Art

Conventional broadband communication systems are increasingly becoming capable of receiving multiple channels simultaneously from among a set of communication channels tor a given communication service or system across the allocated spectrum.

The conventional broadband communication system may include a conventional communications receiver that may be implemented using a single heterodyne or homodyne front end module. These conventional single heterodyne or homodyne front end modules may simultaneously receive multiple channels using a wide intermediate frequency (IF) bandwidth that spans across the multiple channels. The conventional communications receiver may include multiple analog-to-digital converters (ADC) to process the output of the conventional single heterodyne or homodyne front end modules to convert the multiple channels into digital form allowing the multiple channels to be separated and demodulated individually. This approach is further described in U.S. patent application Ser. No. 12/553,687, filed on Sep. 3, 2009, and U.S. patent application Ser. No. 12/553,701, filed on Sep. 3, 2009, each of which is incorporated by reference herein in its entirety.

Alternatively, the conventional communications receiver may be implemented with multiple conventional heterodyne or homodyne front end modules. In this implementation, the conventional communications receiver may include the multiple ADCs to process the output of the multiple conventional heterodyne or homodyne front end modules into digital form to separate and demodulate the multiple channels individually.

In another alternate, the conventional communications receiver may be implemented as a direct sampling receiver. In this implementation, the conventional communications receiver directly samples the multiple channels using an ADC to convert the multiple channels into digital form within the allocated bandwidth. This approach is further described in U.S. patent application Ser. No. 10/952,168, filed on Sep. 29, 2004, now U.S. Pat. No. 7,522,901, which is incorporated by reference herein in its entirety. Also incorporated by reference herein in their entirety, U.S. patent application Ser. No. 10/294,048, filed on Nov. 14, 2002, now U.S. Pat. No. 7,203,227 and U.S. patent application Ser. No. 10/809,893, filed Mar. 26, 2004.

Nevertheless, demodulators which follow these conventional radio frequency (RF) front end modules and ADCs continue to be designed using algorithms developed for single-channel front end modules. Thus, there is a need for an apparatus and/or a method that makes use of the availability of the multiple channels to improve performance of the communications receiver that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

FIG. 1 illustrates a block diagram of communications environment according to an exemplary embodiment of the present invention;

FIG. 2 further illustrates a block diagram of a communications receiver implemented as part of the communications environment according to an exemplary embodiment of the present invention;

Figure 7A:
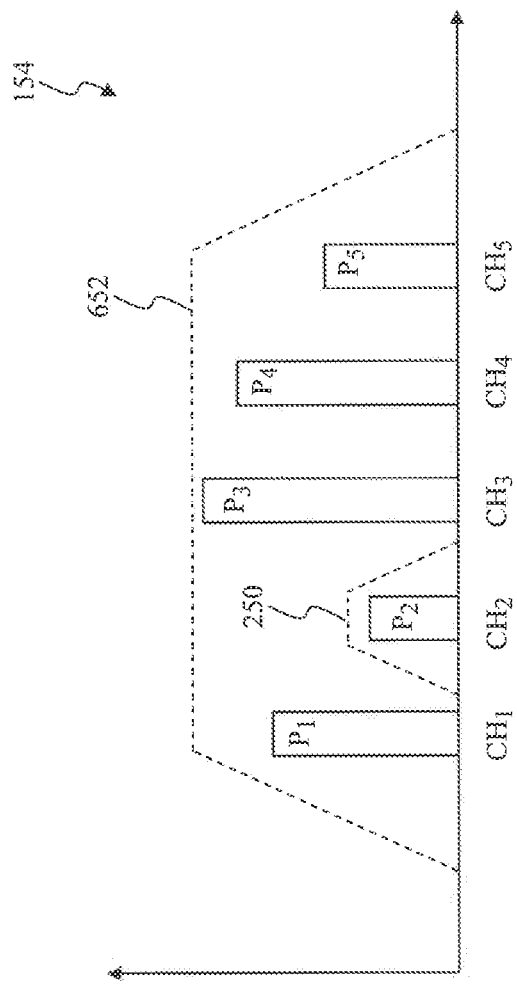
Figure 7B:
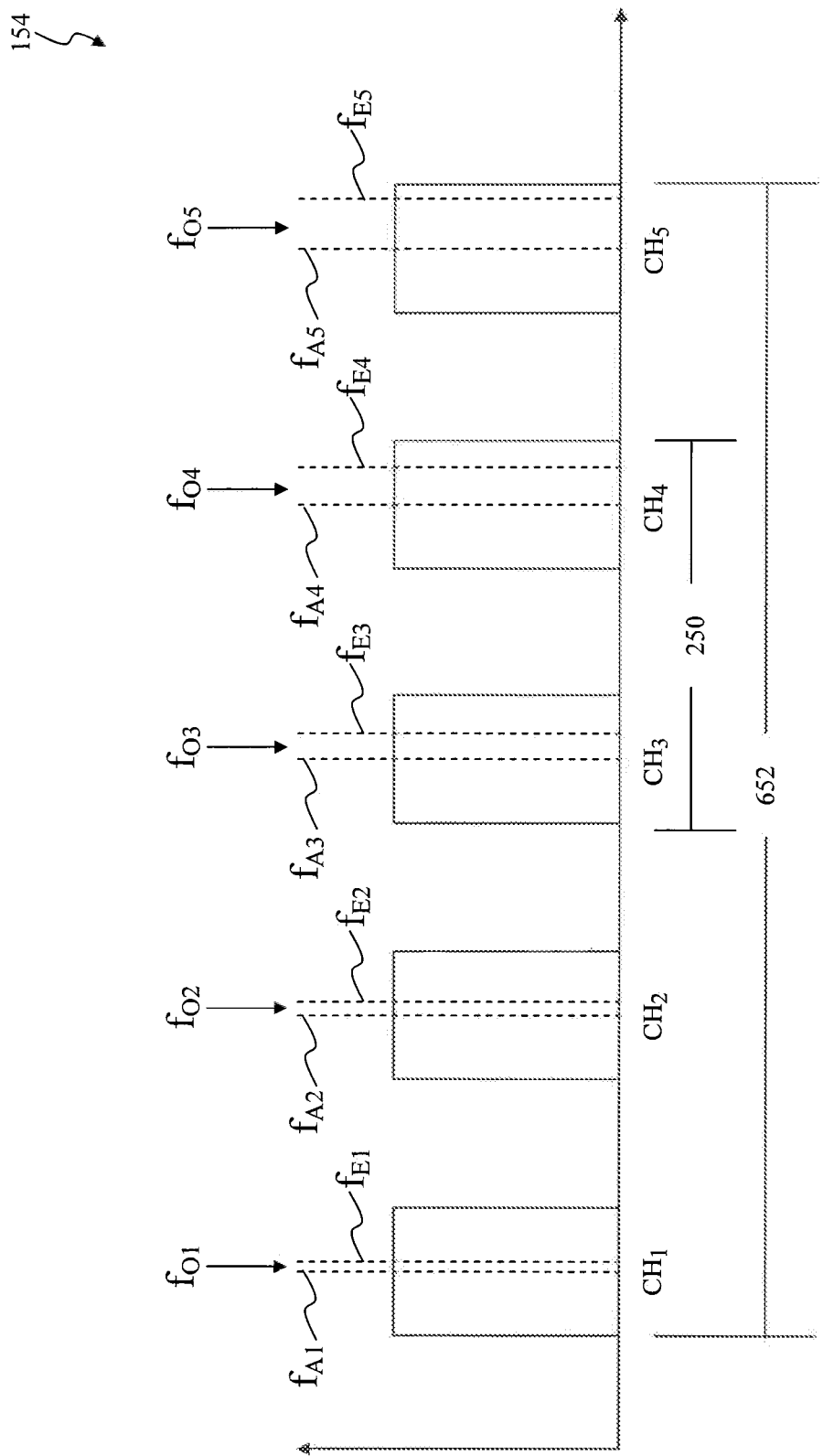
Figure 7C:
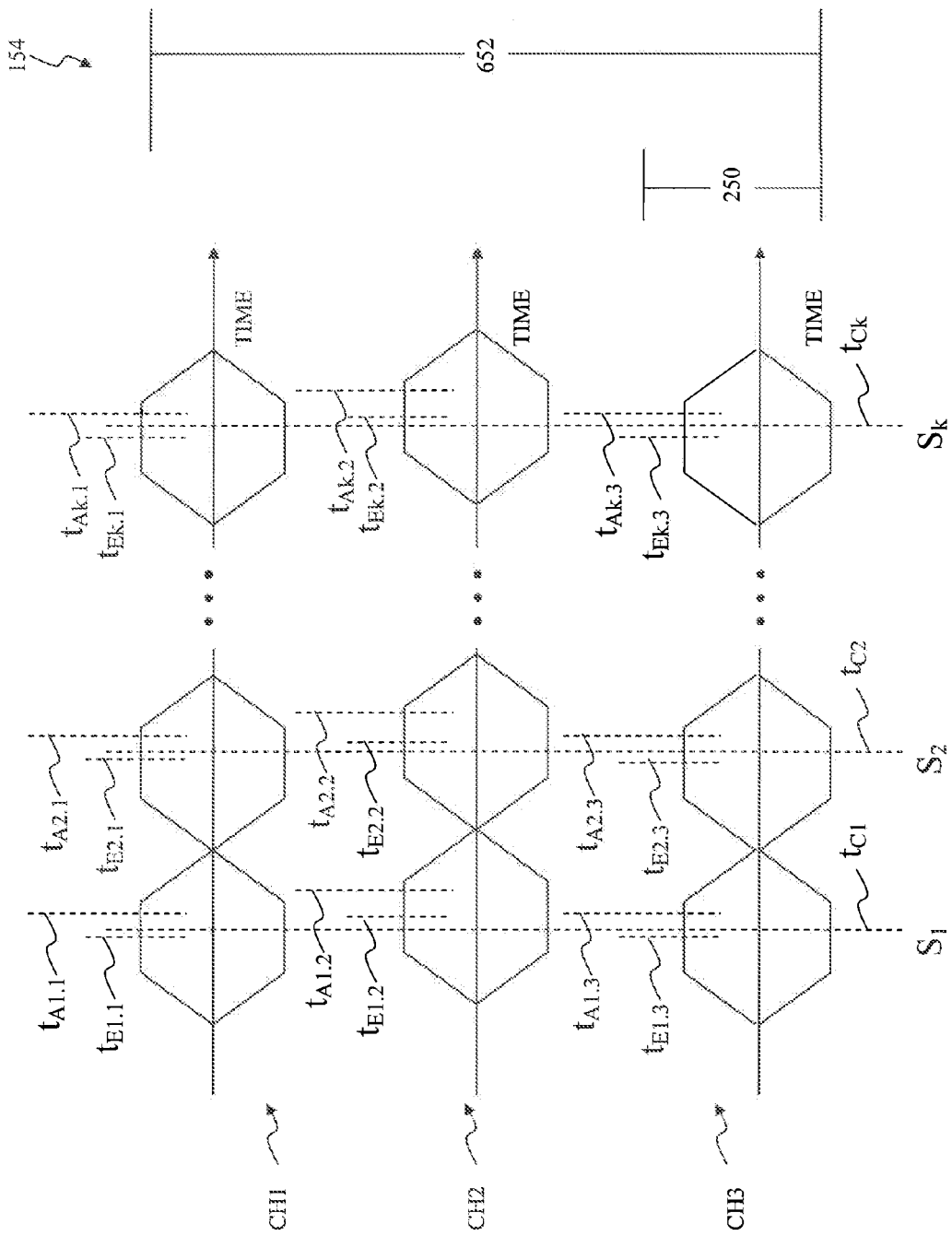
Figure 8:
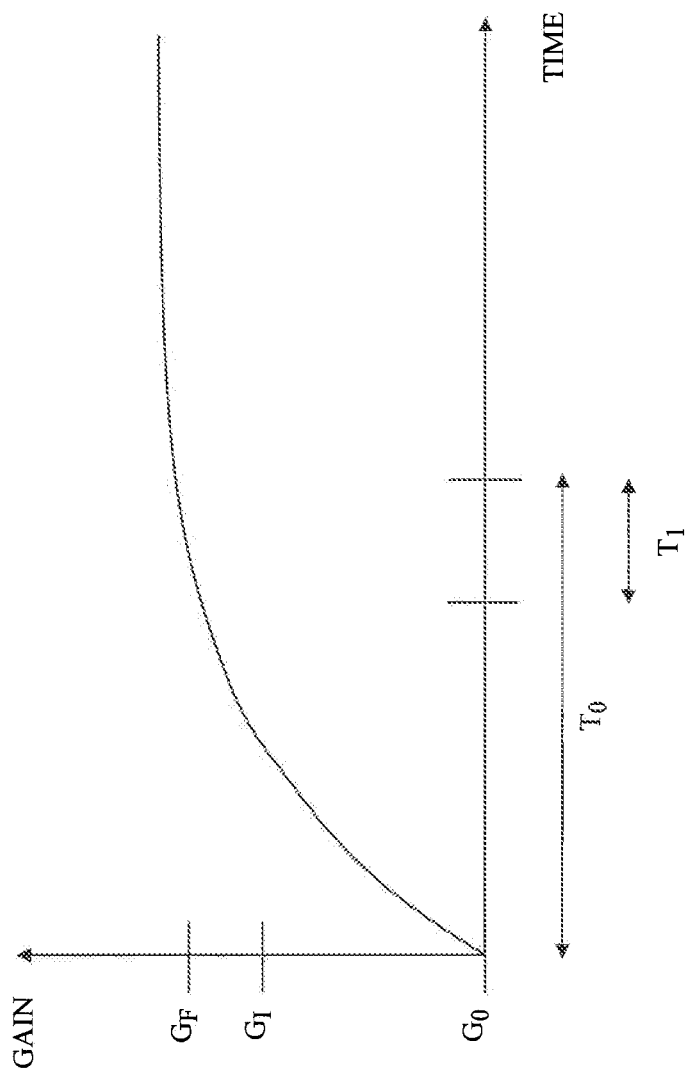
Figure 9:
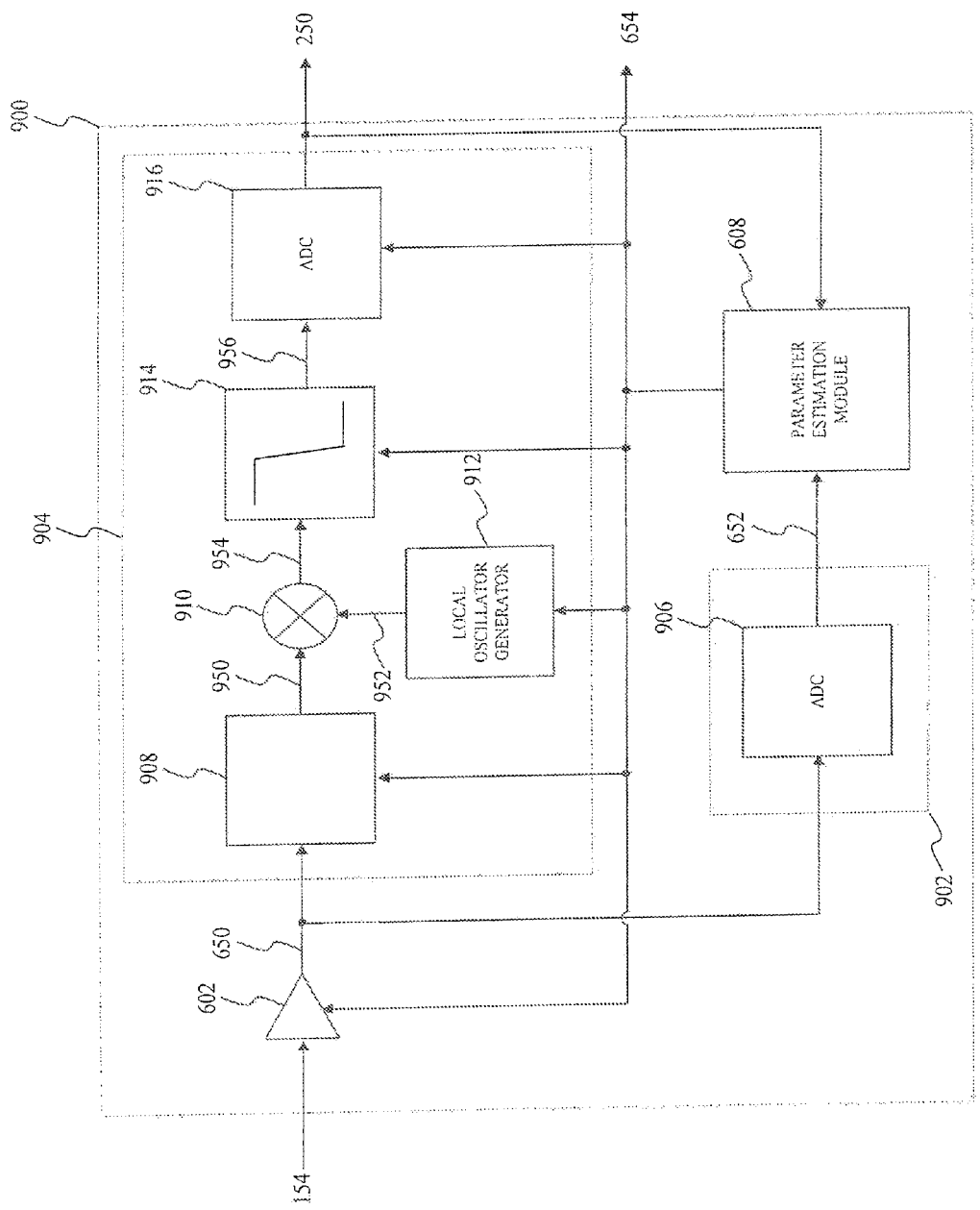
Figure 10:
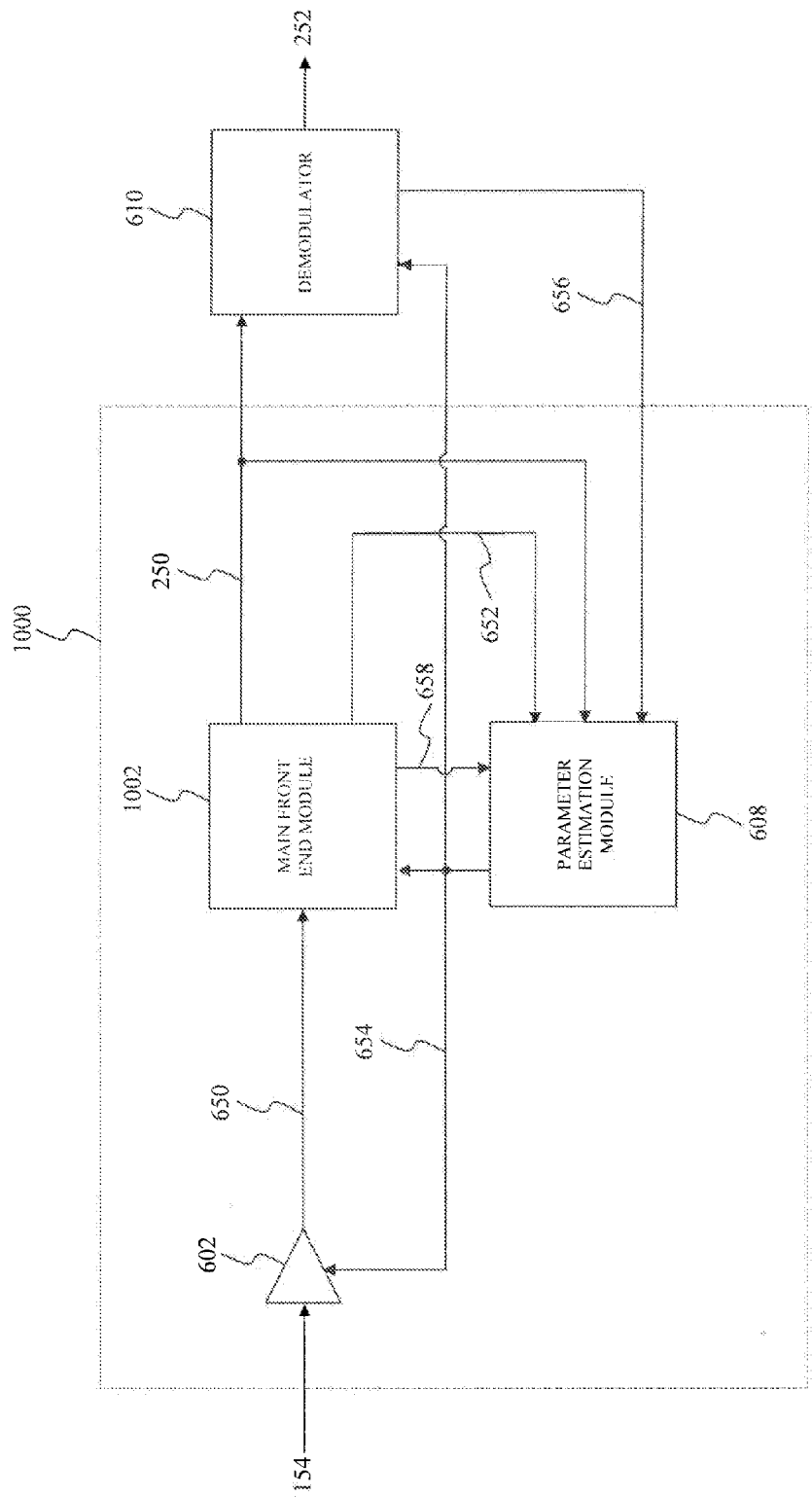
Figure 11:
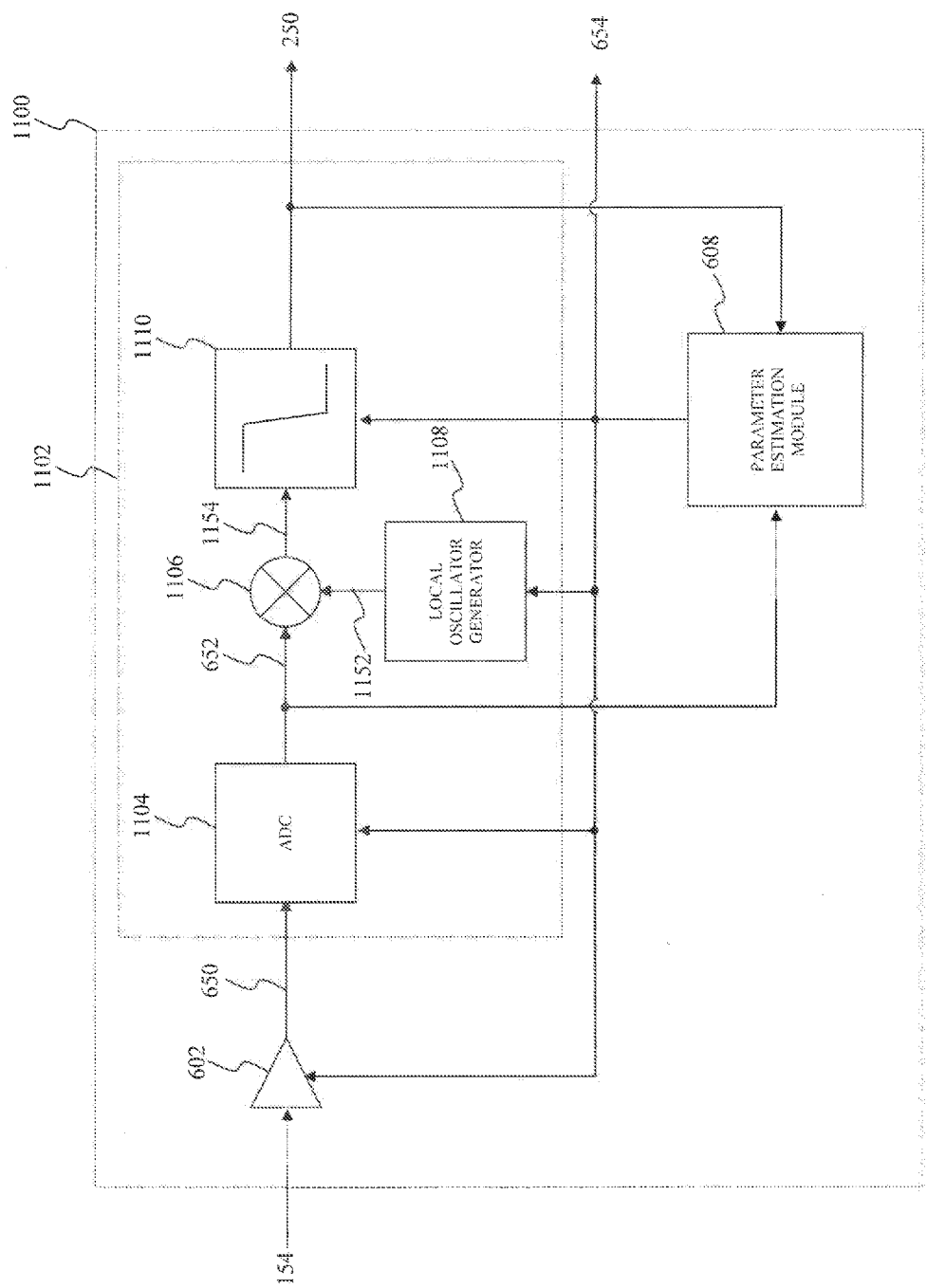
Figure 12:
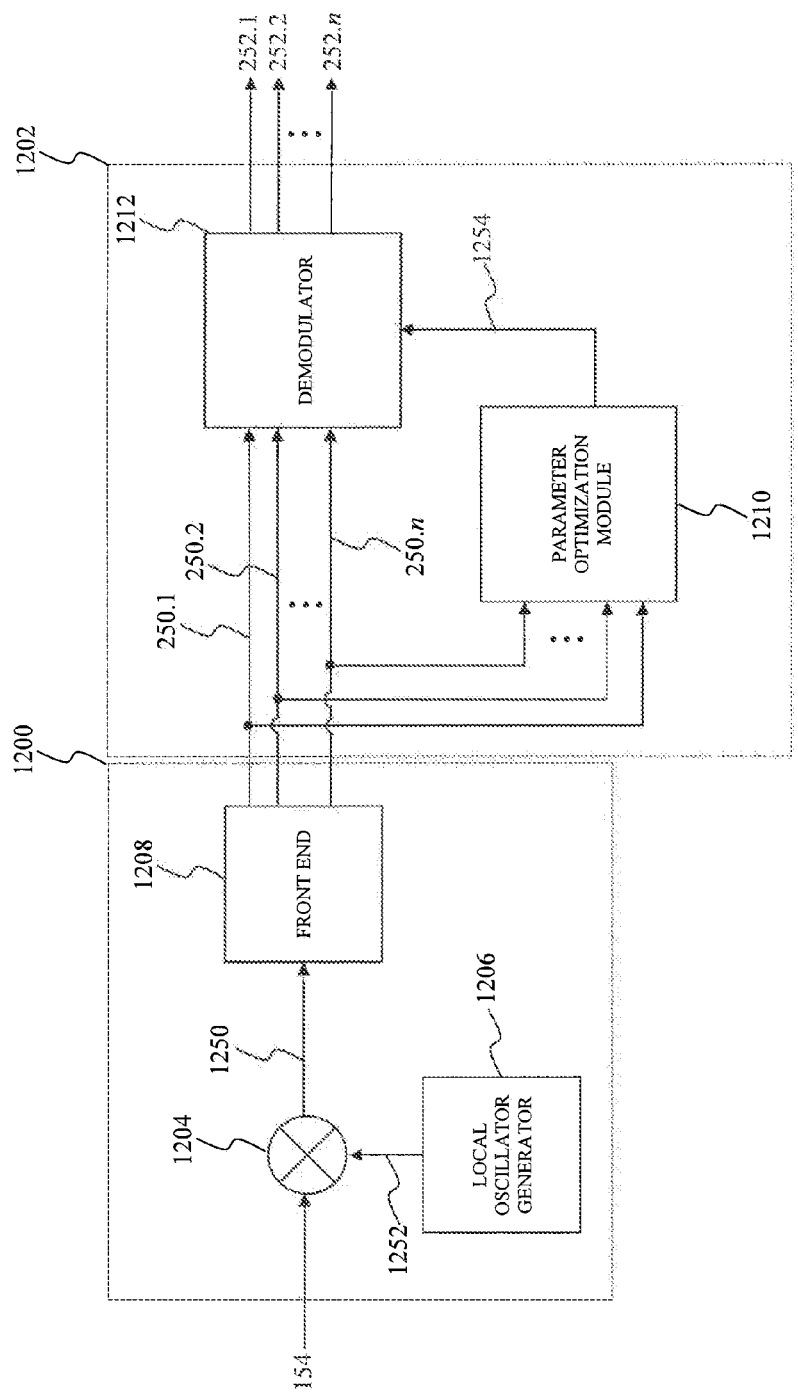

FIG. 7A graphically illustrates an operation of a parameter estimation module that is implemented as part of the front end module according to an exemplary embodiment of the present invention;

FIG. 7B graphically illustrates a second operation of the parameter estimation module according to an exemplary embodiment of the present invention;

FIG. 7C graphically illustrates a third operation of the parameter estimation module according to an exemplary embodiment of the present invention;

FIG. 8 graphically illustrates a settling of an AGC loop that is implemented as part of the front end module according to an exemplary embodiment of the present invention;

FIG. 9 further illustrates the block diagram of the first front end module that is implemented as part of the communications receiver according to an exemplary embodiment of the present invention;

FIG. 10 illustrates a block diagram of a second front end module that is implemented as part of the communications receiver according to an exemplary embodiment of the present invention;

FIG. 11 further illustrates the block diagram of the second front end module that is implemented as part of the communications receiver according to an exemplary embodiment of the present invention; and FIG. 12 illustrates a block diagram of a third front end module and a demodulator module that is implemented as part of the communications receiver according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Communications Environment

Figure 1:
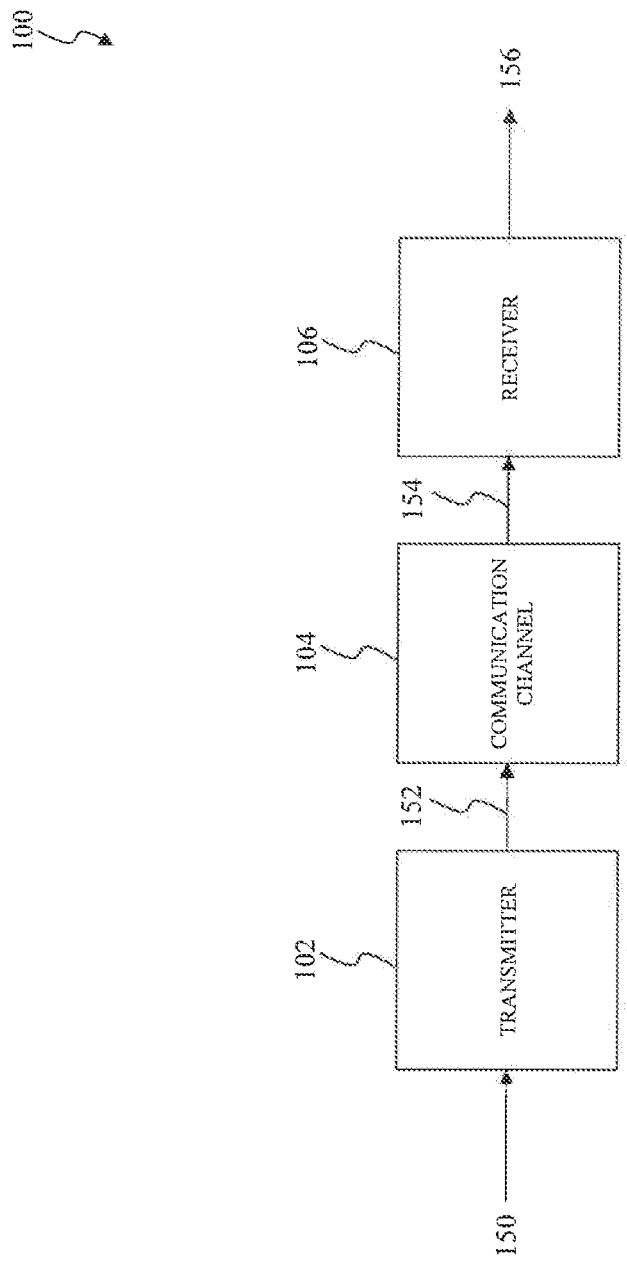

FIG. 1 illustrates a block diagram of communications environment according to an exemplary embodiment of the present invention. The communications environment 100 includes a communications transmitter 102 to transmit one or more information signals, denoted as sequences of data 150, as received from one or more transmitter user devices to a communications receiver 106 via a communications channel 104. The transmitter user devices may include, but are not limited to, personal computers, data terminal equipment, cable modems (CM), set-top boxes, cable modem termination systems (CMTS), telephony devices including cell phones and base stations, broadband media players, personal digital assistants, software applications, and/or any other device that is capable of transmitting data that will be apparent to those skilled in the relevant art(s) without departing from the spirit and scope of the present invention. The communications transmitter 102 transmits the sequences of data 150 to the communications receiver 106 using a transmitted communications signal 152. The transmitted communications signal 152 represents a communications signal that includes multiple transmitted communications channels, commonly referred to as a wideband multi-channel transmitted communications signal. The transmitted communications signal 152 may allocate one or more of the multiple transmitted communications channels within the transmitted communications signal 152 to the one or more transmitter user devices.

The transmitted communications signal 152 passes through the communications channel 104 to provide a received communications signal 154. The communications channel 104 may include, but is not limited to, a microwave radio link, a satellite channel, a fiber optic cable, a hybrid fiber optic coaxial cable system, or a copper cable to provide some examples.

The communications receiver 106 observes the received communications signal 154 as it passes through the communications channel 104. The received communications signal 154 represents a wideband multi-channel received communications signal having multiple received communications channels. However, the communications channel 104, as well as elsewhere in the communications environment 100, may embed interference within and/or impress distortion onto the multiple received communications channels causing them to differ from the multiple transmitted communications channels. For example, this interference and/or distortion may cause the multiple received communications channels to differ in frequency, phase, and/or amplitude from the transmitted multiple communications channels. The communications receiver 106 compensates for the interference embedded within and/or the distortion impressed onto the received communications signal 154. The communications receiver 106 then attempts to determine an estimate of the transmitted sequence 150, often with the goal of generating the most-likely transmitted sequence based upon the received signal 154, for each of the multiple transmitted communications channels, or combinations of the multiple transmitted communications channels, of the transmitted communications signal 152 from the received communications signal 154 to provide one or more recovered information signals, denoted as recovered sequences of data 156, for one or more receiver user devices. The receiver user devices include, but are not limited to, personal computers, data terminal equipment, cable modems (CM), set-top boxes, cable modem termination systems (CMTS), telephony devices including cell phones and base stations, broadband media players, personal digital assistants, software applications, and/or any other device that is capable of receiving data that will be apparent to those skilled in the relevant art(s) without departing from the spirit and scope of the present invention.

Communications Receiver Implemented as Part of the Communications Environment

Figure 2:
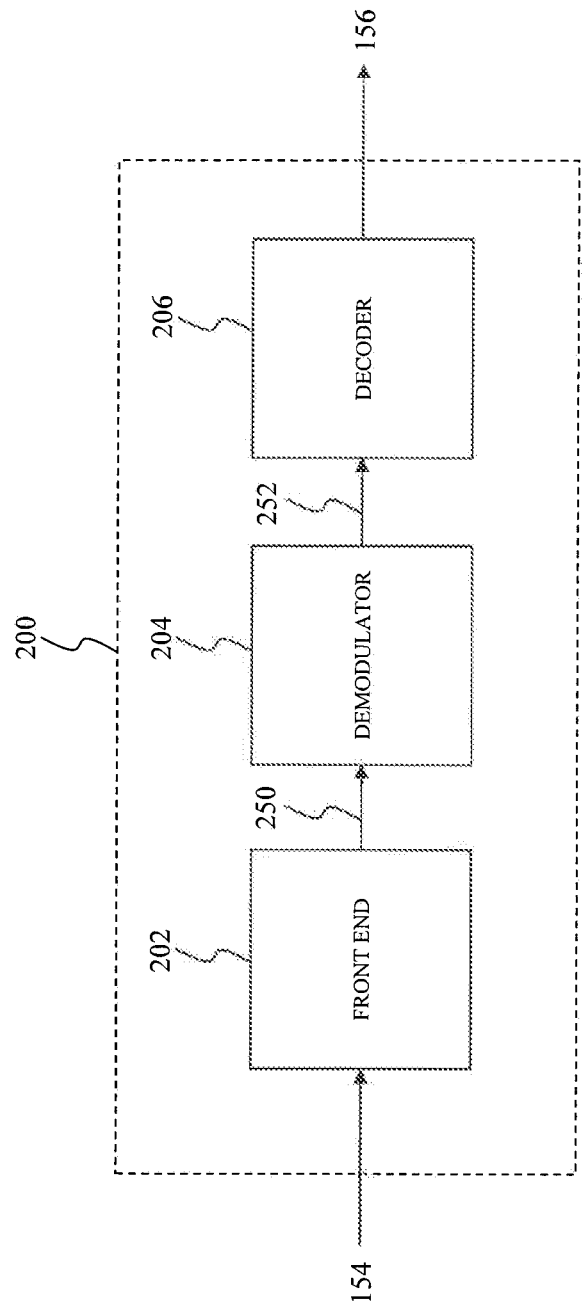

FIG. 2 further illustrates a block diagram of a communications receiver implemented as part of the communications environment according to an exemplary embodiment of the present invention. A communications receiver 200 observes the received communication signal 154 as it passes through the communications channel 104. The communications receiver 200 attempts to determine an estimate of the transmitted sequence for one or more of the multiple transmitted communications channels, or combinations of the multiple transmitted communications channels, of the transmitted communications signal 152 from the received communications signal 154 to provide the recovered sequences of data 156. The communication receiver 200 may represent an exemplary embodiment of the communications receiver 106.

The communications receiver 200 includes a front end module 202, a demodulator module 204, and a decoder module 206. The front end module 202 provides a digital sequence of data 250 or multiple digital sequences of data 250.1 through 250.n based upon the received communications signal 154. The front end module 202 may amplify the received communications signal 154, filter the received communications signal 154 to remove unwanted noise and/or interference, convert the received communications signal 154 from an analog representation to a digital representation, frequency translate the received communications signal 154 to approximately baseband or a suitable intermediate frequency (IF) that will be apparent to those skilled in the relevant art(s) without departing from the spirit and scope of the present invention, and/or any combination thereof. The front end module 202 may include one or more carrier frequency loops to compensate for unknown frequency offsets between the communications transmitter 102 and the communications receiver 200 and/or one or more timing loops to compensate for unknown timing offsets between the communications transmitter 102 and the communications receiver 200.

The demodulator module 204 demodulates the digital sequence of data 250 using any suitable analog or digital demodulation technique for any suitable modulation technique such as amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable demodulation technique that will be apparent to those skilled in the relevant art(s) without departing from the spirit and scope of the present invention to provide a demodulated sequence of data 252. The demodulator module 204 may include one or more adaptive equalizers to compensate for unwanted distortion impressed upon the digital sequence of data 250 by the communications channel 104. The one or more adaptive equalizers may adapt their impulse responses by updating one or more equalization coefficients through a least-squares algorithm, such as the widely known Least Mean Squared (LMS), Recursive Least Squares (RLS), Minimum Mean Squared Error (MMSE) algorithms or any suitable equivalent algorithm that yields an optimized result that will be apparent to those skilled in the relevant art(s) without departing from the spirit and scope of the present invention.

Additionally, the demodulator module 204 may decode the digital sequence of data 250 according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s).

The decoder module 206 performs error correction decoding upon the recovered sequence of data 252 using any suitable decoding scheme that will be apparent to those skilled in the relevant art(s) without departing from the spirit and scope of the present invention to provide the one or more recovered information signals 156. The decoding scheme may include a block decoding scheme, such as Reed-Solomon decoding, a convolutional decoding scheme, such as the Viterbi algorithm, a concatenated decoding scheme involving inner and outer codes, decoding schemes using iterative decoding, partial decoding, iterative decoding involving iterations between channel estimation and partial decoding and full decoding with impulse or burst noise and/or noise unequally distributed among the signaling dimensions such as colored noise, and/or any other suitable decoding scheme that will be apparent to those skilled in the art(s).

Figure 3A:
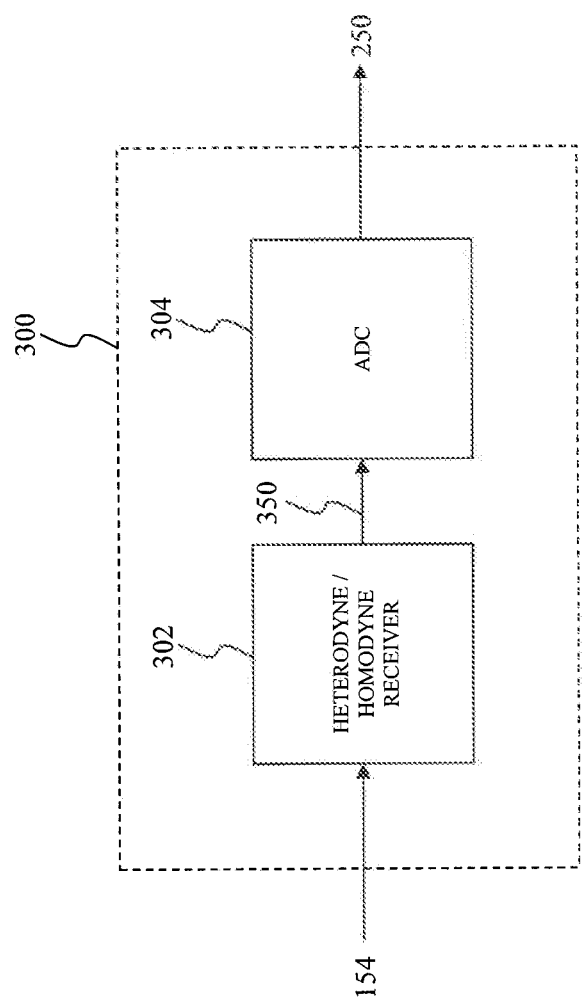
FIG. 3A illustrates a block diagram of a conventional front end module that is implemented as part of the communications receiver.

First Conventional Front End Module that is Implemented as Part of the Communication Receiver FIG. 3A illustrates a block diagram of a conventional front end module that is implemented as part of the communications receiver. A conventional front end module 300 converts the multiple received communications channels of the received communications signal 154 from an analog representation into a digital representation to provide the digital sequence of data 250. The conventional front end module 300 includes a heterodyne/homodyne receiver 302 and an analog-to-digital converter (ADC) 304. The conventional front end module 300 may represent an exemplary embodiment of the front end module 202.

The heterodyne/homodyne receiver 302 downconverts the multiple received communications channels of the received communications signal 154 to approximately baseband or a suitable intermediate frequency (IF) that will be apparent to those skilled in the relevant art(s) without departing from the spirit and scope of the present invention to provide a downconverted communications signal 350. The downconverted communications signal 350 includes each of the multiple received communications channels that have been downconverted to approximately baseband or the suitable IF.

The ADC 304 converts the downconverted communications signal 350 from the analog representation into the digital representation to provide the digital sequence of data 250. The ADC 304 converts the multiple received communications channels that have been downconverted to approximately baseband or the suitable IF into the digital representation.

The conventional front end module 300 is further described in U.S. patent application Ser. No. 12/553,687, filed on Sep. 3, 2009, and U.S. patent application Ser. No. 12/553,701, filed on Sep. 3, 2009, each of which is incorporated by reference herein in its entirety.

Figure 3B:
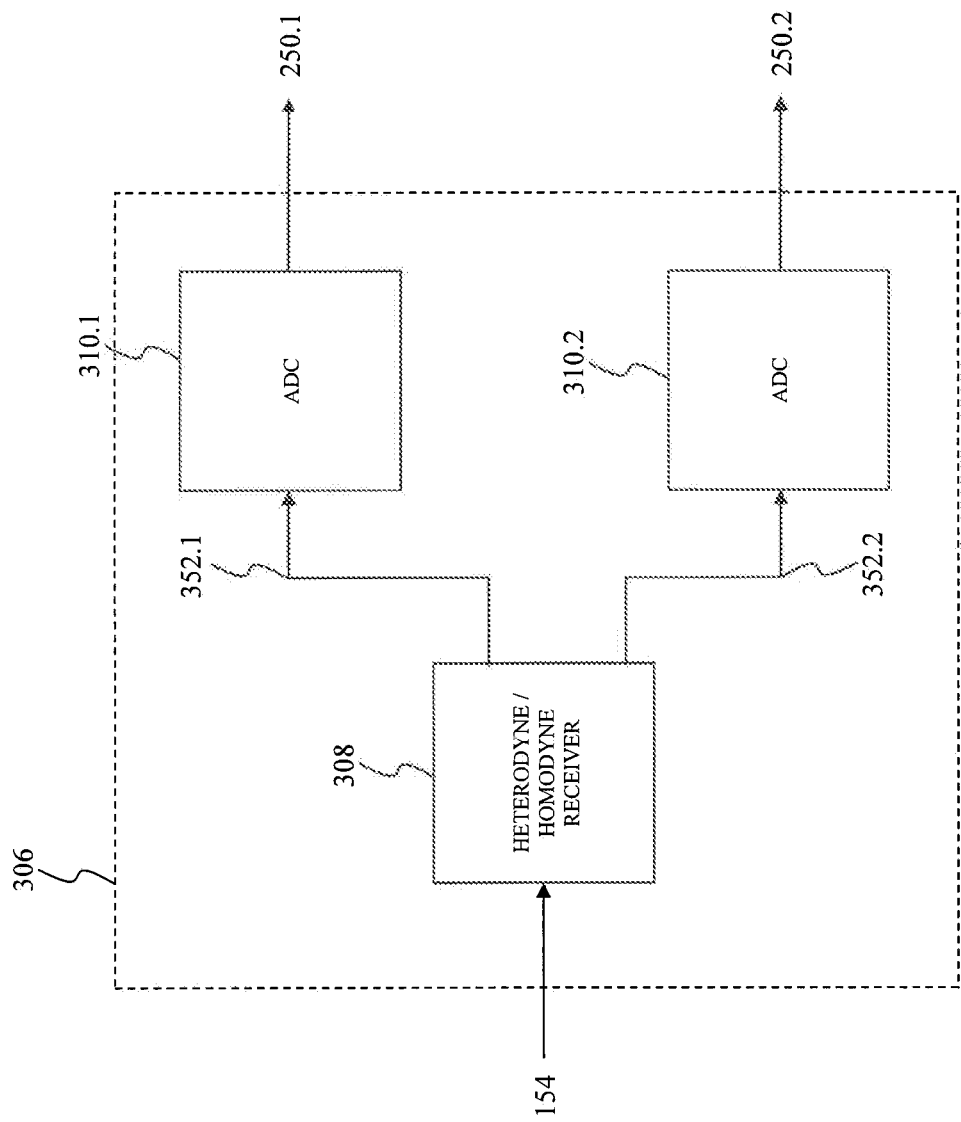
FIG. 3B illustrates a block diagram of a second conventional front end module that is implemented as part of the communications receiver.

Second Conventional Front End Module that is Implemented as Part of the Communication Receiver FIG. 3B illustrates a block diagram of a second conventional front end module that is implemented as part of the communications receiver. A conventional front end module 306 converts a complex representation of the multiple received communications channels of the received communications signal 154 from an analog representation into a digital representation to provide an in-phase digital sequence of data 250.1 and a quadrature phase digital sequence of data 250.2. The conventional front end module 306 includes a heterodyne/homodyne receiver 308 and analog-to-digital converters (ADCs) 310.1 and 310.2. The conventional front end module 306 may represent an exemplary embodiment of the front end module 202.

The multiple received communications channels of the received communications signal 154 may be represented as a complex communication signal having an in-phase component and a quadrature phase component.

The heterodyne/homodyne receiver 308 downconverts the in-phase component and the quadrature phase component of the multiple received communications channels of the received communications signal 154 to approximately baseband or a suitable intermediate frequency (IF) that will be apparent to those skilled in the relevant art(s) without departing from the spirit and scope of the present invention to provide an in-phase downconverted communications signal 352.1 and a quadrature phase downconverted communications signal 352.2, respectively. The downconverted communications signals 352.1 and 352.2 include each of the multiple received communications channels that have been downconverted to approximately baseband or the suitable IF.

The ADC 310.1 and the ADC 310.2 converts the in-phase downconverted communications signal 352.1 and the quadrature phase downconverted communications signal 352.2, respectively, from the analog representation into the digital representation to provide the in-phase digital sequence of data 250.1 and the quadrature phase digital sequence of data 250.2, respectively. The ADC 310.1 and the ADC 310.2 converts the multiple received communications channels that have been downconverted to approximately baseband or the suitable IF into the digital representation.

Figure 4:
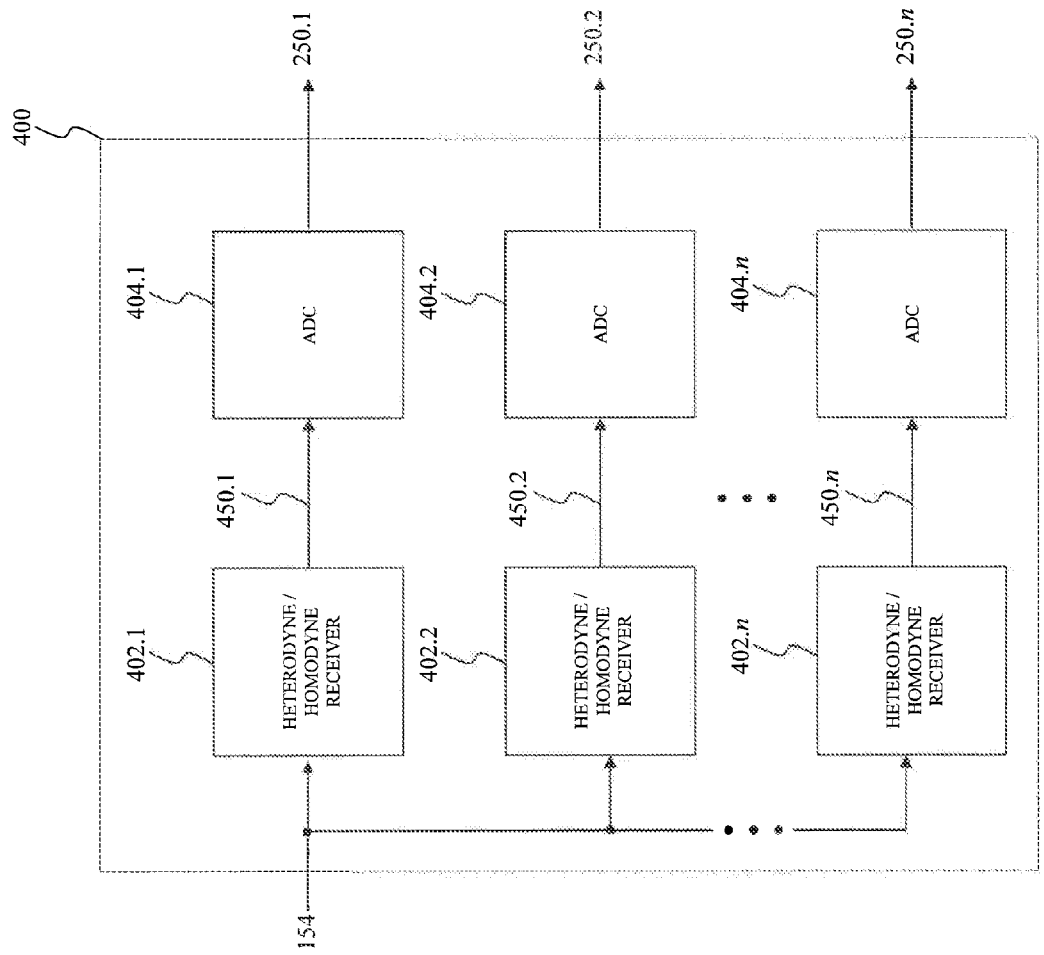
FIG. 4 illustrates a block diagram of a third conventional front end module that is implemented as part of the communications receiver.

Third Conventional Front End Module that is Implemented as Part of the Communication Receiver FIG. 4 illustrates a block diagram of a third conventional front end module that is implemented as part of the communications receiver. A conventional front end module 400 converts the multiple received communications channels of the received communications signal 154 from an analog representation into a digital representation to provide the digital sequences of data 250.1 through 250.*n*. The conventional front end module 400 includes heterodyne/homodyne receivers 402.1 through 402.*n* and analog-to-digital converters (ADC) 404.1 through 404.*n*. The conventional front end module 400 may represent an exemplary embodiment of the front end module 202.

The heterodyne/homodyne receivers 402.1 through 402.*n* downconvert the multiple received communications channels of the received communications signal 154 to approximately baseband or a suitable IF that will be apparent to those skilled in the relevant art(s) without departing from the spirit and scope of the present invention to provide downconverted communications signals 450.1 through 450.*n*. Each of the downconverted communications signals 450.1 through 450.*n* includes one or more of the multiple received communications channels that have been downconverted to approximately baseband or the suitable IF.

The ADCs 404.1 through 404.*n* convert the downconverted communications signals 450.1 through 450.*n* from the analog representation into the digital representation to provide the digital sequences of data 250.1 through 250.*n*. The ADCs 404.1 through 404.*n* convert the multiple received communications channels from their corresponding downconverted communications signal 450.1 through 450.*n* that have been downconverted to approximately baseband or the suitable IF into the digital representation.

Figure 5:
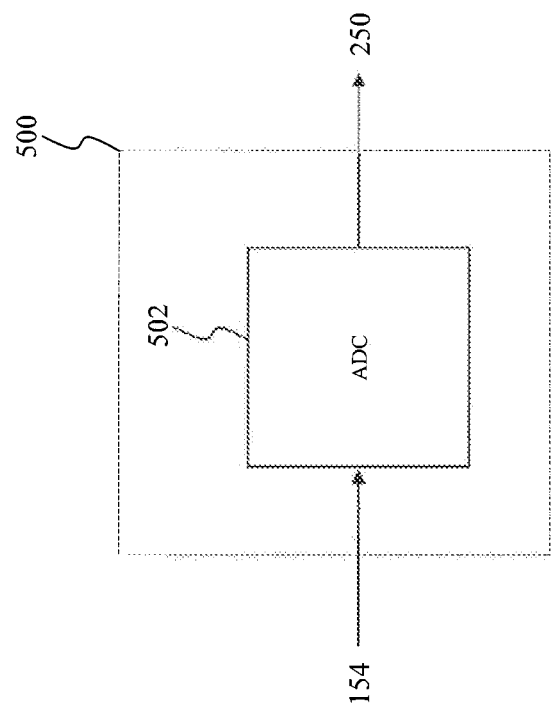
FIG. 5 illustrates a block diagram of a fourth conventional front end module that is implemented as part of the communications receiver.

Fourth Conventional Front End Module that is Implemented as Part of the Communication Receiver FIG. 5 illustrates a block diagram of a fourth conventional front end module that is implemented as part of the communications receiver. A conventional front end module 500 converts the multiple received communications channels of the received communications signal 154 from an analog representation into a digital representation to provide the digital sequence of data 250. The conventional front end module 500 includes an analog-to-digital converter (ADC) 502. The conventional front end module 500 may represent an exemplary embodiment of the front end module 202.

The ADC 502 converts the received communications signal 154 from the analog representation into the digital representation to provide the digital sequence of data 250. The ADC 502 converts the multiple received communications channels of the received communications signal 154 into the digital representation 250.

The conventional front end module 500 is further described in U.S. patent application Ser. No. 10/952,168, filed on Sep. 29, 2004, now U.S. Pat. No. 7,522,901, which is incorporated by reference herein in its entirety.

Figure 6A:
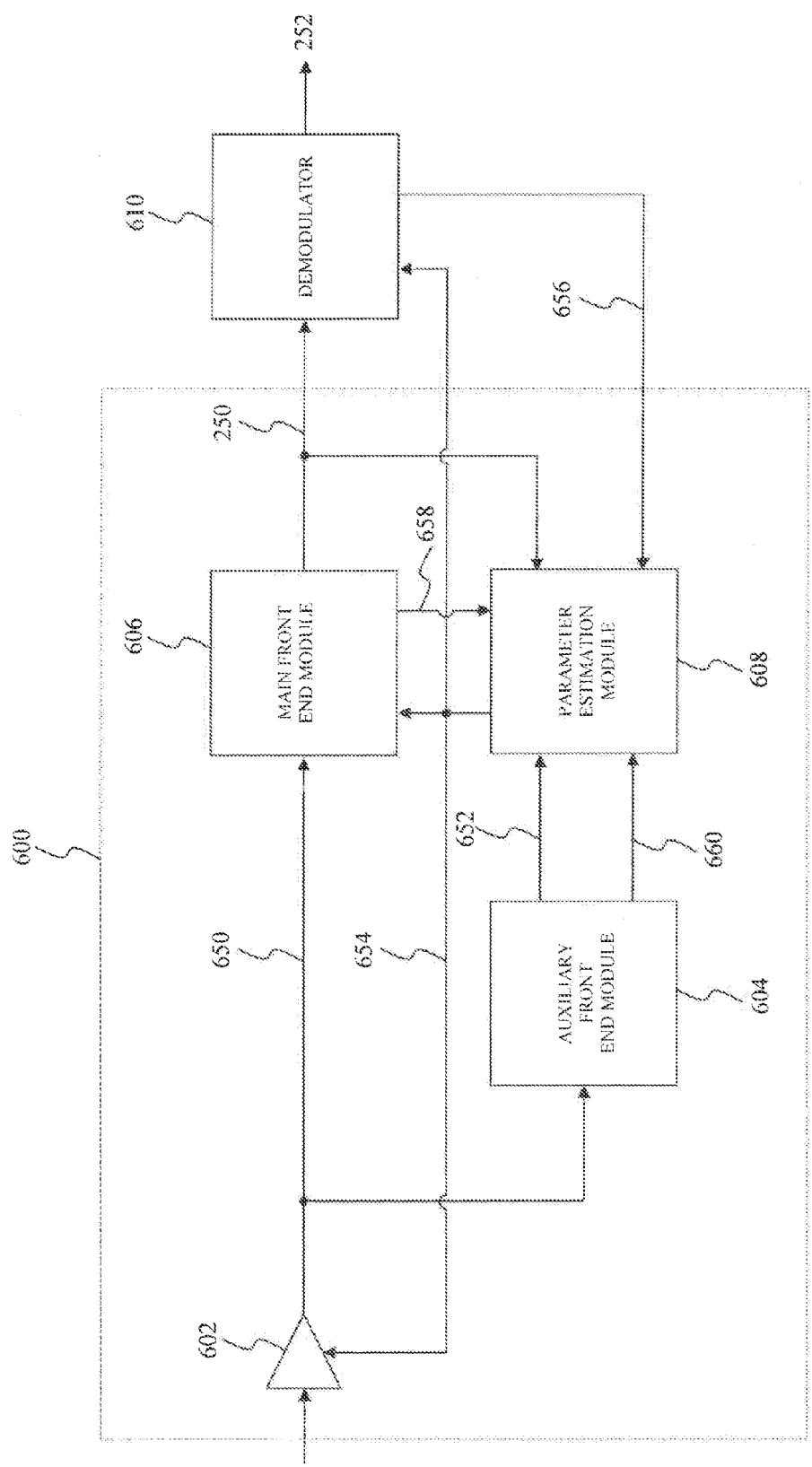
FIG. 6A illustrates a block diagram of a first front end module that is implemented as part of the communications receiver according to an exemplary embodiment of the present invention.

Exemplary Embodiment of a First Front End Module that is Implemented as Part of the Communications Receiver FIG. 6 illustrates a block diagram of a first front end module that is implemented as part of the communications receiver according to an exemplary embodiment of the present invention. A front end module 600 includes an optional amplifier module 602, an auxiliary front end module 604, a main front end module 606, and a parameter estimation module 608. The front end module 600 may represent an exemplary embodiment of the front end module 202. The front end module 600 may be optionally coupled to a demodulator module 610.

The optional amplifier module 602 may amplify the received communications signal 154 according to an amplifier gain g to provide an amplified communications signal 650.

The auxiliary front end module 604 and the main front end module 606 may process the received communications signal 154, or optionally, the amplified communications signal 650, to provide the digital sequence of data 250 and an auxiliary digital sequence of data 652. For example, the auxiliary front end module 604 and/or the main front end module 606 may filter the amplified communications signal 650, remove unwanted noise and/or interference from the amplified communications signal 650, convert the amplified communications signal 650 from an analog representation to a digital representation, frequency translate the amplified communications signal 650 to approximately baseband or a suitable intermediate frequency (IF) that will be apparent to those skilled in the relevant art(s) without departing from the spirit and scope of the present invention, and/or any combination thereof. In this example, the auxiliary front end module 604 and/or the main front end module 606 may communicate information resulting from their respective processes to the parameter estimation module 608 as a main module information 658 and/or an auxiliary module information 660, respectively.

Generally, the auxiliary front end module 604 and/or the main front end module 606 may be a direct sampling front end module or a conversion based front end module. For example, the auxiliary front end module 604 and/or the main front end module 606 may be implemented using the conventional front end module 300, the conventional front end module 306, the conventional front end module 400, the conventional front end module 500, any other suitable front end module that is capable of processing the amplified communications signal 650 from the analog representation to the digital representation that will be apparent to those skilled in the relevant art(s) without departing from the spirit and scope of the present invention, or portions and/or combinations thereof.

The auxiliary front end module 604 and the main front end module 606 provide an auxiliary digital sequence of data 652 and the digital sequence of data 250, respectively, based upon the amplified communications signal 650. Typically, the auxiliary digital sequence of data 652 may be characterized as including a greater number of received communications channels when compared to the digital sequence of data 250. For example, the digital sequence of data 250 may represent a narrow band communications signal having a smaller number of received communications channels and the auxiliary digital sequence of data 652 may represent a wideband communications signal having a larger number of received communications channels. In an exemplary embodiment, the auxiliary front end module 604 is characterized as having a lesser dynamic range than the main front end module 606.

The parameter estimation module 608 estimates one or more communications receiver parameters 654 based upon the digital sequence of data 250, the auxiliary digital sequence of data 652, demodulator information 656, main module information 658 and/or auxiliary module information 660. The demodulator information 656, the main module information 658 and the auxiliary module information 660 may represent information that is communicated from the auxiliary front end module 604, the main front end module 606, and the demodulator module 610, respectively.

In an exemplary embodiment, the parameter estimation module 608 may estimate the one or more communications receiver parameters 654 based upon the auxiliary digital sequence of data 652. Typically, in this example, the one or more communications receiver parameters 654 may include automatic gain control (AGC) parameters, adaptive filter coefficients, sampling clock characteristics, local oscillator characteristics, carrier tracking loop parameters, timing loop parameters, adaptive equalization coefficients, frequency compensation parameters, phase compensation parameters, offset compensation parameters, and/or any other suitable parameter that may be used by the communications receiver 200, the front end module 600, and/or the main front end module 606 that will be apparent to those skilled in the relevant art(s) without departing from the spirit and scope of the present invention. In this exemplary embodiment, the parameter estimation module 608 estimates the one or more communications receiver parameters 654 for a greater number of received communications signals and/or channels which is then applied to process a lesser number of received communications signals and/or channels. For example, the parameter estimation module 608 may estimate AGC parameters for m communications signals and/or channels and use these AGC parameters as a basis for determining AGC parameters for n communications signals and/or channels, where m is greater than or equal n. As another example, the parameter estimation module 608 may estimate carrier tracking loop parameters for the m communications signals and/or channels and use these carrier tracking loop parameters as a basis for determining timing loop parameters for the n communications signals and/or channels. As a further example, the parameter estimation module 608 may estimate timing loop parameters for the m communications signals and/or channels and use these timing loop parameters as a basis for determining timing loop parameters for the n communications signals and/or channels.

In another exemplary embodiment, the parameter estimation module 608 may estimate the one or more communications receiver parameters 654 based upon a relationship between the digital sequence of data 250 and the auxiliary digital sequence of data 652. Typically, in this embodiment, the one or more communications receiver parameters 654 may include a phase offset between the auxiliary digital sequence of data 652 and the digital sequence of data 250, a frequency offset between the auxiliary digital sequence of data 652 and the digital sequence of data 250, a timing offset between the auxiliary digital sequence of data 652 and the digital sequence of data 250 and/or any other suitable parameter that may be used by the communications receiver 200, the front end module 600, and/or the main front end module 606 that will be apparent to those skilled in the relevant art(s) without departing from the spirit and scope of the present invention.

In a further exemplary embodiment, the parameter estimation module 608 may estimate the one or more communications receiver parameters 654 based upon the main module information 658 and/or the auxiliary module information 660. For example, the auxiliary front end module 604 and/or the main front end module 606 may include one or more carrier frequency loops to compensate for unknown frequency offsets between the communications transmitter 102 and the communications receiver 200 and/or one or more timing loops to compensate for unknown timing offsets between the communications transmitter 102 and the communications receiver 200. The auxiliary front end module 604 and/or the main front end module 606 may communicate the unknown frequency offsets and/or the unknown timing offsets to the parameter estimation module 608 as the main module information 658 and the auxiliary module information 660, respectively. In this exemplary embodiment, the parameter estimation module 608 may use the main module information 658 and the auxiliary module information 660 to estimate the unknown frequency offsets and/or the unknown timing offsets for the m communications signals and/or channels and use these unknown frequency offsets and/or the unknown timing offsets as a basis for determining the unknown frequency offsets and/or the unknown timing offsets for the n communications signals and/or channels n.

In a yet further embodiment, the parameter estimation module 608 may estimate the one or more communications receiver parameters 654 based upon the demodulator information 656. For example, the demodulator module 610 may include one or more adaptive equalizers to compensate for unwanted distortion impressed upon the digital sequence of data 250 by the communications channel 104. The one or more adaptive equalizers may adapt their impulse responses by updating one or more equalization coefficients through a least-squares algorithm, such as the widely known Least Mean Squared (LMS), Recursive Least Squares (RLS), Minimum Mean Squared Error (MMSE) algorithms or any suitable equivalent algorithm that yields an optimized result that will be apparent to those skilled in the relevant art(s) without departing from the spirit and scope of the present invention. The demodulator module 610 may communicate the one or more equalization coefficients to the parameter estimation module 608 as the demodulator information 656. In this exemplary embodiment, the parameter estimation module 608 may use the demodulator information 656 to estimate the one or more equalization coefficients for the m communications signals and/or channels and use these one or more equalization coefficients as a basis for determining the one or more equalization coefficients for the n communications signals and/or channels.

However, these exemplary embodiments are not limiting, those skilled in the relevant art(s) will recognize that the parameter estimation module 608 may estimate any other suitable communications parameter for the m communications signals and/or channels and use this other suitable communications parameter as a basis for determining another suitable communications parameter for the n communications signals and/or channels using any combination of the digital sequence of data 250, the auxiliary digital sequence of data 652, the demodulator information 656, the main module information 658 and/or the auxiliary module information 660 without departing from the spirit and scope of the present invention.

The demodulator 610 demodulates and/or decodes the digital sequence of data 250 in accordance with the one or more communications receiver parameters 654 to provide the demodulated sequence of data 252. The demodulator 610 may represent an exemplary embodiment of the demodulator 204.

Figure 6B:
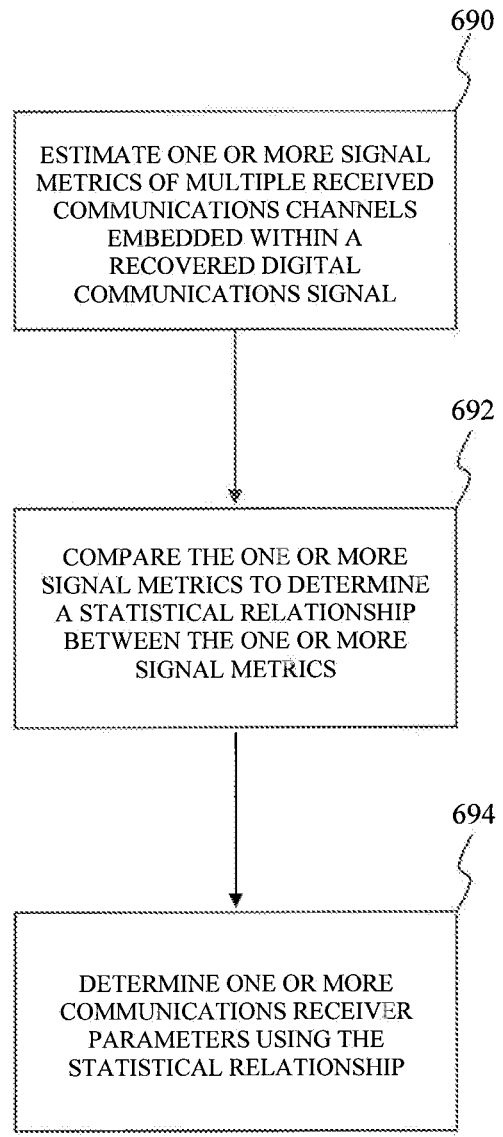
FIG. 6B is a flowchart of exemplary operational steps of the parameter estimation module that is implemented as part of the front end module receiver according to an exemplary embodiment of the present invention.

FIG. 6B is a flowchart of exemplary operational steps of the parameter estimation module that is implemented as part of the front end module receiver according to an exemplary embodiment of the present invention. The invention is not limited to this operational description. Rather, it will be apparent to persons skilled in the relevant art(s) that other operational control flows are within the scope and spirit of the present invention. The following discussion describes the steps in FIG. 6B.

At step 690, the operational control flow estimates one or more signal metrics of the multiple received communications channels embedded within a recovered digital communications signal, such as the auxiliary digital sequence of data 652 to provide an example. The operational control flow may use a Fast Fourier Transform (FFT) or any other suitable digital signal processing algorithm that will be apparent to those skilled in the relevant art(s) without departing from the spirit and scope of the present invention to determine the one or more signal metrics.

At step 692, the operational control flow compares the one or more signal metrics from step 690 to determine a statistical relationship between the one or more signal metrics.

At step 694, the operational control flow determines one or more communications receiver parameters, such as the one or more communications receiver parameters 654 to provide an example, using the statistical relationship from step 692.

FIG. 7A graphically illustrates a first operation of a parameter estimation module that is implemented as part of the front end module according to an exemplary embodiment of the present invention. Specifically, FIG. 7A graphically illustrates a frequency domain representation of the received communications signal 154, the digital sequence of data 250, and the auxiliary digital sequence of data 652. The received communications signal 154 may be characterized as including received communications channels $CH_1$ through $CH_5$. The auxiliary front end module 604 provides the auxiliary digital sequence of data 652 that may be characterized as including received communications channels $CH_1$ through $CH_5$. The main front end module 606 provides the digital sequence of data 250 that may be characterized as including received communications channel $CH_2$. However, these characterizations of the received communications signal 154, the digital sequence of data 250, and the auxiliary digital sequence of data 652 are for illustrative purposes only, those skilled in the relevant art(s) will recognize that the received communications signal 154, the digital sequence of data 250, and/or the auxiliary digital sequence of data 652 may include more or less received communications channels and/or different received communications channels than illustrated without departing from the spirit and scope of the present invention.

The parameter estimation module 608 estimates one or more signal metrics of the received communications channels $CH_1$ through $CH_5$ embedded within the auxiliary digital sequence of data 652 without departing from the spirit and scope of the present invention. The one or more signal metrics may include a mean, a total energy, an average power, a mean square, an instantaneous power, a root mean square, a variance, a norm, a voltage level, a phase offset between the auxiliary digital sequence of data 652 and the digital sequence of data 250, a frequency offset between the auxiliary digital sequence of data 652 and the digital sequence of data 250, a timing offset between the auxiliary digital sequence of data 652 and the digital sequence of data 250, synchronization epoch information such as puncture alignment of a decoder and/or facilitating upstream synchronization, and/or deinterleaver timing, and/or frame synchronization timing, or any other suitable signal metric of the received communications channels $CH_1$ through $CH_5$ which will be apparent to those skilled in the relevant art(s) without departing from the spirit and scope of the present invention, and/or any combination thereof. For example, the parameter estimation module 608 may determine a corresponding instantaneous power $P_1$ through $P_s$ for the received communications channels $CH_1$ through $CH_5$. However, this example is not limiting, those skilled in the relevant art(s) will recognize that the parameter estimation module 608 may determine other AGC parameters, carrier tracking loop parameters, timing loop parameters, adaptive equalization coefficients, and/or any other suitable communications receiver parameter that may be used by the communications receiver 200 and/or the front end module 600 that will be apparent to those skilled in the relevant art(s) without departing from the spirit and scope of the present invention. The parameter estimation module 608 may use a Fast Fourier Transform (FFT) or any other suitable digital signal processing algorithm that will be apparent to those skilled in the relevant art(s) to determine the one or more signal metrics.

The parameter estimation module 608 compares the one or more signal metrics to determine a statistical relationship between the one or more signal metrics. The statistical relationship may include a mean, medium, maximum, minimum, correlation, auto-correlation, or any other suitable statistical measurement that will be apparent to those skilled in the relevant art(s) without departing from the spirit and scope of the present invention. From the example above, the parameter estimation module 608 may compare the instantaneous powers $P_1$ through $P_5$ to determine a maximum instantaneous power from among instantaneous powers $P_1$ through $P_5$.

The parameter estimation module 608 determines the one or more communications receiver parameters 654 based upon the statistical relationship between the one or more signal metrics. In this example, the parameter estimation module 608 determines, as the one or more communications receiver parameters 654, a corresponding AGC parameter to be used by the front end module 600 based upon the instantaneous power $P_3$.

Referring again to FIG. 6A, the front end module 600 may use the one or more communications receiver parameters 654 to configure and/or adjust operational settings such as AGC settings, carrier tracking loop settings, timing loop settings, adaptive equalization coefficients, and/or any other suitable communications receiver setting that may be used by the communications receiver 200 and/or the front end module 600 to recover the recovered sequences of data 156 from the received communications signal 154 that will be apparent to those skilled in the relevant art(s) without departing from the spirit and scope of the present invention.

As an example, the optional amplifier module 602 may use the one or more communications receiver parameters 654 to configure and/or adjust use the amplifier gain g that is used to amplify the multiple received communications channels of the received communications signal 154.

As another example, the main front end module 606 may use the one or more communications receiver parameters 654 to configure and/or adjust its operational settings. For example, the main front end module 606 may configure and/or adjust operational settings used to filter the amplified communications signal 650 to remove unwanted noise and/or interference to convert the amplified communications signal 650 from the analog representation to the digital representation, to frequency translate the amplified communications signal 650 to approximately baseband or the suitable intermediate frequency (IF), and/or any combination thereof.

As a further example, the main front end module 606 may configure and/or adjust operational settings for one or more carrier frequency loops to compensate for unknown frequency offsets between the communications transmitter 102 and the communications receiver 200 and/or one or more timing loops to compensate for unknown timing offsets between the communications transmitter 102 and the communications receiver 200.

FIG. 7B graphically illustrates a second operation of the parameter estimation module. Specifically, FIG. 7B graphically illustrates a frequency domain representation of the received communications signal 154, the digital sequence of data 250, and the auxiliary digital sequence of data 652. The received communications signal 154 may be characterized as including received communications channels $CH_1$ through $CH_5$. The auxiliary front end module 604 provides the auxiliary digital sequence of data 652 that may be characterized as including received communications channels $CH_1$ through $CH_5$. The main front end module 606 provides the digital sequence of data 250 that may be characterized as including received communications channels $CH_3$ and $CH_4$. However, these characterizations of the received communications signal 154, the digital sequence of data 250, and the auxiliary digital sequence of data 652 are for illustrative purposes only, those skilled in the relevant art(s) will recognize that the received communications signal 154, the digital sequence of data 250, and/or the auxiliary digital sequence of data 652 may include more or less received communications channels and/or different received communications channels than illustrated without departing from the spirit and scope of the present invention.

As shown in FIG. 7B, an expected frequency $f_{E1}$ through $f_{E5}$ for each of the received communications channels $CH_1$ through $CH_5$ is offset from an actual frequency $f_{A1}$ through $f_{A5}$ by a corresponding frequency offset $f_{O1}$ through $f_{O5}$. The actual frequencies $f_{A1}$ through $f_{A5}$ represent one or more frequencies within the auxiliary digital sequence of data 652 as received by the front end module 600. However, the actual frequencies $f_{A1}$ through $f_{A5}$ are offset from their corresponding expected frequencies $f_{E1}$ through $f_{E5}$ by their corresponding frequency offsets $f_{O1}$ through $f_{O5}$.

The parameter estimation module 608 estimates the frequency offsets $f_{O1}$ through $f_{O5}$ within the auxiliary digital sequence of data 652 to provide a carrier offset discriminate function corresponding to the received communications channels $CH_1$ through $CH_5$. For example, as shown in FIG. 7B, the frequency offsets $f_{O1}$ through $f_{O5}$ are largely proportional to their corresponding actual frequencies $f_{A1}$ through $f_{A5}$. In this example, the parameter optimization module 608 may determine a carrier offset discriminate function, usually in terms of part per million, that characterizes the frequency offsets $f_{O1}$ through $f_{O5}$ for the received communications channels $CH_1$ through $CH_5$. As another example, the frequency offsets $f_{O1}$ through $f_{O5}$ are substantially similar to each other. In this example, the parameter optimization module 608 may determine a carrier offset discriminate function that characterizes the frequency offsets $f_{O1}$ through $f_{O5}$ for the received communications channels $CH_1$ through $CH_5$. As a further example, the frequency offsets $f_{O1}$ through $f_{O5}$ may be any combination of this substantially similar offset and the largely proportional offset as described above. As a yet further example, the parameter optimization module 608 may be provided information relating to the frequency offsets $f_{O1}$ through $f_{O5}$ or knows this information from previous and current acquisition and tracking. In this example, the parameter estimation module 608 may determine a carrier offset discriminate function that characterizes the frequency offsets $f_{O1}$ through $f_{O5}$ for the received communications channels $CH_1$ through $CH_5$ using this information.

The parameter estimation module 608 determines the one or more communications receiver parameters 654 that may be used to compensate for the frequency offsets $f_{O3}$ and $f_{O4}$ within the received communications channels $CH_3$ and $CH_4$ based upon the carrier offset discriminate function that has been determined based upon the received communications channels $CH_1$ through $CH_5$.

Alternatively, the one or more communications receiver parameters 654 may represent initial operational settings for acquisition of the multiple received communications channels of the received communications signal 154. The auxiliary front end module 604 and the parameter estimation module 608 determine the one or more communications receiver parameters 654 using the multiple received communications channels, as described above, before acquisition of the multiple received communications channels by the main front end module 606. The main front end module 606 may use these near correct initial operational settings established from the multiple received communications channels to substantially lessen acquisition time of the multiple received communications channels. Alternatively, the main front end module 606 may use these near correct initial operational settings established from the multiple received communications channels to substantially lessen acquisition time when switching from among the multiple received communications channels.

FIG. 7C graphically illustrates a third operation of the parameter estimation module according to an exemplary embodiment of the present invention. Specifically, FIG. 7C graphically illustrates a time domain representation of the received communications signal 154, the digital sequence of data 250, and the auxiliary digital sequence of data 652. The received communications signal 154 may be characterized as including received communications channels $CH_1$ through $CH_3$. The auxiliary front end module 604 provides the auxiliary digital sequence of data 652 that may be characterized as including received communications channels $CH_1$ through $CH_3$. The main front end module 606 provides the digital sequence of data 250 that may be characterized as including received communications channels $CH_3$. However, these characterizations of the received communications signal 154, the digital sequence of data 250, and the auxiliary digital sequence of data 652 are for illustrative purposes only, those skilled in the relevant art(s) will recognize that the received communications signal 154, the digital sequence of data 250, and/or the auxiliary digital sequence of data 652 may include more or less received communications channels and/or different received communications channels than illustrated without departing from the spirit and scope of the present invention.

Shown in FIG. 7C are eye-diagrams for symbols $S_1$ through $S_K$ for the received communications channels $CH_1$ through $CH_3$. Each of the symbols $S_1$ through $S_K$ for each of the received communications channels $CH_1$ through $CH_3$ is expected to be sampled at its eye-diagram's respective maximum value. For example, the symbol $S_1$ of $CH_1$ is expected to be sampled at $t_{E1.1}$, the symbol $S_1$ of $CH_2$ is expected to be sampled at $t_{E1.2}$, and the $S_1$ of $CH_3$ is expected to be sampled at $t_{E1.3}$. As another example, the symbol $S_2$ of $CH_1$ is expected to be sampled at $t_{E1.2}$, the symbol $S_2$ of $CH_2$ is expected to be sampled at $tE_{2.2}$, and the $S_2$ of $CH_3$ is expected to be sampled at $t_{E2.3}$. As a further example, the symbol $S_k$ of $CH_1$ is expected to be sampled at $t_{Ek.1}$, the symbol $S_k$ of $CH_2$ is expected to be sampled at $tE_{k.2}$, and the $S_k$ of $CH_3$ is expected to be sampled at $t_{Ek.3}$.

However, each of the symbols $S_1$ through $S_K$ for each of the received communications channels $CH_1$ through $CH_3$ is actually sampled at values that differ from their expected values. For example, the symbol $S_1$ of $CH_1$ is actually sampled at $t_{A1.1}$, the symbol $S_1$ of $CH_2$ is actually sampled at $t_{A1.2}$, and the $S_1$ of $CH_3$ is actually sampled at $t_{A1.3}$. As another example, the symbol $S_2$ of $CH_1$ is actually sampled at $t_{A1.2}$, the symbol $S_2$ of $CH_2$ is actually sampled at $tA2_{.2}$, and the $S_2$ of $CH_3$ is actually sampled at $t_{A2.3}$. As a farther example, the symbol $S_k$ of $CH_1$ is actually sampled at $t_{A2.3}$, the symbol $S_k$ of $CH_2$ is actually sampled at $tAk_{.2}$, and the $S_k$ of $CH_3$ is actually sampled at $t_{Ak.3}$.

The parameter estimation module 608 estimates the difference between the expected sampling time and the actual sampling time for the symbols $S_1$ through $S_K$ within the auxiliary digital sequence of data 652 to provide a corresponding timing error descriminate $T_{C1}$ through $T_{CK}$ for the symbols $S_1$ through $S_K$. The timing error discriminates $T_{C1}$ through $T_{CK}$ may be the same for each symbol or differ between symbols. The timing error discriminates $T_{C1}$ through $T_{CK}$ represent a general timing error discriminate that is determined from the received communications channel $CH_1$ through $CH_3$. For example, the difference between the expected sampling time and the actual sampling time for the symbols $S_1$ through $S_K$ are substantially similar for the received communications channel $CH_1$ through $CH_3$. Therefore, the general timing error discriminate reduces acquisition of symbol timing for each of the received communications channel $CH_1$ through $CH_3$. In another example, the difference between the expected sampling time and the actual sampling time for the symbols $S_1$ through $S_K$ differs between the received communications channel $CH_1$ through $CH_3$, but in a manner known or communicated to the parameter estimation module 608, thus enabling beneficial use of joint symbol timing across the received communications channel $CH_1$ through $CH_3$ even with dissimilar timing in each of the received communications channel $CH_1$ through $CH_3$.

The parameter estimation module 608 determines the one or more communications receiver parameters 654 based upon the timing error discriminates $T_{C1}$ through $T_{CK}$. The main front end module 606 may use the one or more communications receiver parameters 654 as an initial condition to substantially lessen acquisition time of the received communications channel $CH_3$.

FIG. 8 graphically illustrates a settling of an AGC loop that is implemented as part of the front end module according to an exemplary embodiment of the present invention. As shown in FIG. 8, a conventional AGC loop requires a first finite amount of time $T_o$ to settle to a final value $G_F$ during acquisition of the multiple received communications channels. The initial operating parameters of the conventional AGC loop are unknown during acquisition of the multiple received communications channels causing the conventional AGC loop to adjust its gain from approximately zero gain $G_0$ until reaching the final value $G_F$.

An AGC loop formed by the optional amplifier module 602 and the parameter estimation module 608 requires a second finite amount of time $T_1$ to settle to the final value $G_F$ during acquisition of the multiple received communications channels. In contrast to the conventional AGC loop, the initial operating parameters of the AGC loop are known. The AGC loop determines an initial gain value $G_I$ using the multiple received communications channels as described above before acquisition of the multiple received communications channels by the main front end module 606. The AGC loop then adjusts its gain from the initial gain value $G_I$ to the final value $G_F$, thereby reducing the time required for the AGC loop to settle to $T_1$ seconds.

However, this example is not limiting, those skilled in the relevant art(s) will recognize that the present invention may be used to determine other communications receiver settings, such as carrier tracking loop settings, timing loop settings, adaptive equalization coefficients to provide some examples, jointly on an ensemble of channels rather than operating on each channel independently without departing from the spirit and scope of the present invention.

FIG. 9 further illustrates the block diagram of the first front end module that is implemented as part of the communications receiver according to an exemplary embodiment of the present invention. This exemplary embodiment is not limiting, those skilled in the relevant art(s) will recognize that other embodiments of the front end module are possible without departing from the spirit and scope of the present invention. A front end module 900 includes the optional amplifier module 602, the parameter estimation module 608, an auxiliary front end module 902, and a main front end module 904. The front end module 900 may represent an exemplary embodiment of the front end module 600.

The optional amplifier module 602 may amplify the received communications signal 154 to provide the amplified communications signal 650.

The auxiliary front end module 902 provides the auxiliary digital sequence of data 652 based upon the amplified communications signal 650. The auxiliary front end module 902 may represent an exemplary embodiment of the auxiliary front end module 604. The auxiliary front end module 902 includes an analog to digital converter (ADC) 906. The ADC 906 converts the amplified communications signal 650 from the analog representation into the digital representation to provide the auxiliary digital sequence of data 652. The ADC 906 converts each of the multiple received communications channels of the amplified communications signal 650 into the digital representation.

The parameter estimation module 608 estimates the one or more communications receiver parameters 654 based upon the digital sequence of data 250 and/or the auxiliary digital sequence of data 652 as described above.

The main front end module 904 provides the digital sequence of data 250 based upon the amplified communications signal 650. The main front end module 904 includes a channel selection filtering module 908, a mixer module 910, a local oscillator generator module 912, a low pass filtering module 914, and an ADC 916. The main front end module 904 may represent an exemplary embodiment of the main front end module 606.

The channel selection filtering module 908 is configured to remove one or more unwanted channels from among the multiple received communications channels embedded within the amplified communications signal 650 to provide a desired communications channel 950, the desired communications channel 950 including one or more desired channels from among the multiple received communications channels. The channel selection filtering module 908 may adjust its respective frequency response in response to the one or more communications receiver parameters 654. For example, the channel selection filtering module 908 may adjust its respective filtering bandwidth, center frequency, and/or frequency roll off in response to the one or more communications receiver parameters 654.

The mixer module 910 frequency translates the desired communications channel 950 using a local oscillator signal 952 to provide a translated communications channel 954. The mixer module 910 may frequency translate the desired communications channel 950 to approximately baseband or a suitable intermediate frequency (IF) that will be apparent to those skilled in the relevant art(s) without departing from the spirit and scope of the present invention.

The local oscillator generator module 912 provides the local oscillator signal 952. The local oscillator generator module 912 may adjust a frequency and/or a phase of the local oscillator signal 952 in response to the one or more communications receiver parameters 654.

The low pass filtering module 914 removes unwanted noise and/or interference from the translated communications channel 954 to provide a filtered communications channel 956. The low pass filtering module 914 may adjust its respective frequency response in response to the one or more communications receiver parameters 654. For example, the low pass filtering module 914 may adjust its respective filtering bandwidth, center frequency, and/or frequency roll off in response to the one or more communications receiver parameters 654.

The ADC 916 converts the filtered communications channel 956 from the analog representation into the digital representation to provide the digital sequence of data 250. The ADC 916 may adjust its sampling clock used to convert the filtered communications channel 956 from the analog representation into the digital representation response to the one or more communications receiver parameters 654. For example, the ADC 916 may adjust a frequency and/or a phase of its sampling clock in response to the one or more communications receiver parameters 654.

Exemplary Embodiment of a Second Front End Module that is Implemented as Part of the Communications Receiver FIG. 10 illustrates a block diagram of a second front end module that is implemented as part of the communications receiver according to an exemplary embodiment of the present invention. A front end module 1000 includes the optional amplifier module 602, the parameter estimation module 608, and a main front end module 1002. The front end module 1000 may represent an exemplary embodiment of the front end module 202.

The optional amplifier module 602 may amplify the received communications signal 154 to provide the amplified communications signal 650.

The parameter estimation module 608 estimates the one or more communications receiver parameters 654 based upon any combination of the digital sequence of data 250, the auxiliary digital sequence of data 652, the demodulator information 656, and/or the main module information 658 without departing from the spirit and scope of the present invention as described above.

The main front end module 1002 may filter the amplified communications signal 650, remove unwanted noise and/or interference, convert the amplified communications signal 650 from an analog representation to a digital representation, frequency translate the amplified communications signal 650 to approximately baseband or a suitable intermediate frequency (IF) that will be apparent to those skilled in the relevant art(s) without departing from the spirit and scope of the present invention, and/or any combination thereof. The main front end module 1002 may include one or more carrier frequency loops to compensate for unknown frequency offsets between the communications transmitter 102 and the communications receiver 200 and/or one or more timing loops to compensate for unknown timing offsets between the communications transmitter 102 and the communications receiver 200.

Generally, the main front end module 1002 may be a direct sampling or a conversion based front end module. For example, the main front end module 1002 may be implemented using the conventional front end module 300, the conventional front end module 306, the conventional front end module 400, the conventional front end module 500, and/or any other suitable front end module that is capable of converting the amplified communications signal 650 from the analog representation to the digital representation to the digital representation that will be apparent to those skilled in the relevant art(s) without departing from the spirit and scope of the present invention.

The main front end module 1002 provides the digital sequence of data 250 and the auxiliary digital sequence of data 652 based upon the amplified communications signal 650.

The main front end module 1002 may use the one or more communications receiver parameters 654 to configure and/or adjust its operational settings. For example, the main front end module 1002 may configure and/or adjust operational settings used to filter the amplified communications signal 650, to remove unwanted noise and/or interference from the amplified communications signal 650, to convert the amplified communications signal 650 from the analog representation to the digital representation, to frequency translate the amplified communications signal 650 to approximately baseband or the suitable intermediate frequency (IF), and/or any combination thereof. As another example, the main front end module 1002 may configure and/or adjust operational settings of the one or more carrier frequency loops to compensate for unknown frequency offsets between the communications transmitter 102 and the communications receiver 200 and/or the one or more timing loops to compensate for unknown timing offsets between the communications transmitter 102 and the communications receiver 200.

FIG. 11 further illustrates the block diagram of the second front end module that is implemented as part of the communications receiver according to an exemplary embodiment of the present invention. This exemplary embodiment is not limiting, those skilled in the relevant art(s) will recognize that other embodiments of the front end module are possible without departing from the spirit and scope of the present invention. A front end module 1100 includes the optional amplifier module 602, the parameter estimation module 608, and a main front end module 1102. The front end module 1100 may represent an exemplary embodiment of the front end module 1000.

The optional amplifier module 602 may amplify the received communications signal 154 to provide the amplified communications signal 650.

The parameter estimation module 608 estimates one or more communications receiver parameters 654 based upon the digital sequence of data 250 and/or the auxiliary digital sequence of data 652 as described above.

The main front end module 1104 provides the digital sequence of data 250 and the auxiliary digital sequence of data 652 based upon the amplified communications signal 650. The main front end module 1104 includes an ADC 1104, a multiplication module 1106, a local oscillator generator module 1108, and a low pass filtering module 1110. The main front end module 1102 may represent an exemplary embodiment of the main front end module 1002.

The ADC 1104 converts the amplified communications signal 650 from the analog representation into the digital representation to provide the auxiliary digital sequence of data 652. The ADC 1104 may adjust its sampling clock used to convert the amplified communications signal 650 in response to the one or more communications receiver parameters 654. For example, the ADC 1104 may adjust a frequency and/or a phase of its sampling clock in response to the one or more communications receiver parameters 654. The ADC 1104 converts each of the multiple received communications channels of the amplified communications signal 650 into the digital representation.

The multiplication module 1106 frequency translates the auxiliary digital sequence of data 652 using a local oscillator signal 1152 to provide a translated sequence of data 1154. The multiplication module 1106 may frequency translate the auxiliary digital sequence of data 652 to approximately baseband or a suitable intermediate frequency (IF) that will be apparent to those skilled in the relevant art(s) without departing from the spirit and scope of the present invention.

The local oscillator generator module 1108 provides the local oscillator signal 1152. The local oscillator generator module 1108 may adjust a frequency and/or a phase of the local oscillator signal 1152 in response to the one or more communications receiver parameters 654.

The low pass filtering module 1110 removes unwanted noise and/or interference from the translated sequence of data 1154 to provide the digital sequence of data 250. The low pass filtering module 1110 may adjust its respective frequency response in response to the one or more communications receiver parameters 654. For example, the low pass filtering module 1110 may adjusts its respective filtering bandwidth, center frequency, and/or frequency roll off in response to the one or more communications receiver parameters 654.

Exemplary Embodiment of a Third Front End Module and a Demodulator Module that is Implemented as Part of the Communications Receiver Referring again to FIG. 6 and FIG. 10, the parameter estimation module 608 may provide the one or more communications receiver parameters 654 to the front end module 600 and/or the front end module 1000 as well as to other modules within the communications receiver 200 such as the demodulator module 204 and/or the decoder module 206 to provide some examples. For example, the demodulator module 204 may include one or more adaptive equalizers that compensate for unwanted distortion impressed upon the digital sequence of data 250 by the communications channel 104. The one or more adaptive equalizers may adapt their impulse responses by updating one or more equalization coefficients through a least-squares algorithm, such as the widely known Least Mean Squared (LMS), Recursive Least Squares (RLS), Minimum Mean Squared Error (MMSE) algorithms or any suitable equivalent algorithm that yields an optimized result that will be apparent to those skilled in the relevant art(s) without departing from the spirit and scope of the present invention. The demodulator module 204 may use the one or more communications receiver parameters 654 to configure and/or adjust the one or more equalization coefficients.

FIG. 12 illustrates a block diagram of a third front end module and a demodulator module that is implemented as part of the communications receiver according to an exemplary embodiment of the present invention. A front end module 1200 includes a mixer module 1204, a local oscillator generator 1206, and a front end 1208. The mixer module 1204 frequency translates the received communications signal 154 using a local oscillator signal 1252 to provide a translated communications signal 1250. The mixer module 1204 may frequency translate the received communications signal 154 to approximately baseband or a suitable intermediate frequency (IF) that will be apparent to those skilled in the relevant art(s) without departing from the spirit and scope of the present invention.

The local oscillator generator module 1206 provides the local oscillator signal 1252. The local oscillator signal 1252 may be characterized as having phase noise. This phase noise is common between the multiple channels of the translated communications signal 1250.

The front end module 1208 provides the digital sequences of data 250.1 through 250.n based upon the translated communications signal 1250. The front end module 1208 may be implemented using the conventional front end module 300, the conventional front end module 400, the conventional front end module 500, the front end module 600, the front end module 1000, any other suitable front end module that is capable of processing the translated communications signal 1250 to the digital representation that will be apparent to those skilled in the relevant art(s) without departing from the spirit and scope of the present invention, or portions and/or combinations thereof.

A demodulator module 1202 includes a parameter optimization module 1210 and a demodulator module 1212. The parameter optimization module 1210 provides one or more communications receiver parameters 1254 to the demodulator module 1212. The parameter optimization module 1210 estimates phase noise of the local oscillator generator module 1206 that is present within the translated communications signal 1250. Typically, the parameter optimization module 1210 produces a more accurate estimate for this component of an overall system phase noise by basing the estimate of the phase noise of the local oscillator module 1206 on the digital sequences of data 250.1 through 250.n rather than one of the digital sequences of data 250.1 through 250.n. In an exemplary embodiment, a non-uniform weighting is applied in combining discriminants associated with carrier frequency and/or phase tracking operations associated with the digital sequences of data 250.1 through 250.n in the parameter optimization module 1210, emphasizing the discriminants, such as carrier frequency and/or phase error discriminants, from digital sequences of data 250.1 through 250.n that have higher carrier tracking loop signal-to-noise ratios and de-emphasizing the discriminants from digital sequences of data 250.1 through 250.n that have lower carrier tracking loop signal-to-noise ratios. In another exemplary embodiment, a non-uniform weighting of the carrier frequency and/or phase tracking discriminants is applied based upon differing amounts of phase noise in the transmitted signals corresponding to the digital sequences of data 250.1 through 250.n since, in general, this component of the overall system phase noise may differ from among the digital sequences of data 250.1 through 250.n, either in a learned or a prior fashion. In a further exemplary embodiment, tracking filter parameters involved in generating the carrier frequency and/or phase error discriminants for the digital sequences of data 250.1 through 250.n differ, owing to different signal-to-noise ratios of the digital sequences of data 250.1 through 250.n, and/or owing to different amount of transmit phase noise variance in the digital sequences of data 250.1 through 250.n, to name two factors such that different parameters provide a better joint estimate than using a common set of tracking filter parameters for each of the digital sequences of data 250.1 through 250.n. The parameter optimization module 1210 provides the one or more communications receiver parameters 1254 to the demodulator module 1202.

The demodulator module 1212 demodulates the digital sequences of data 250.1 through 250.n using any suitable analog or digital demodulation technique for any suitable modulation technique such as amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable demodulation technique that will be apparent to those skilled in the relevant art(s) without departing from the spirit and scope of the present invention to provide demodulated sequences of data 252.1 through 252.n. Additionally, the demodulator module 1212 may decode the digital sequences of data 250.1 through 250.n according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s). The demodulator module 1212 uses the one or more communications receiver parameters 1254 to substantially reduce the phase noise of the local oscillator generator module 1206 that is present within the digital sequences of data 250.1 through 250.n.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A front end module for determining an operational setting of a communications receiver, the front end module comprising:
    an auxiliary front end module configured to provide a first sequence of data based on a communications signal, the communications signal including a plurality of communications channels, and the first sequence of data occupying a first group of communications channels from among the plurality of communications channels;
    a parameter estimation module configured to:
        estimate a plurality of signal metrics of the plurality of communications channels,
        determine a statistical relationship between the plurality of signal metrics, and
        estimate, based on the statistical relationship and the first sequence of data, a communications receiver parameter;
    a main front end module configured to provide a second sequence of data in accordance with the communications receiver parameter based on the communications signal, the second sequence of data occupying a second group of communications channels from among the plurality of communications channels, wherein the second group of communications channels includes a fewer number of communications channels than the first group of communications channels.

2. The front end module of claim 1, wherein the plurality of communications channels are embedded within the communications signal, and wherein the main front end module comprises:
    a mixer module configured to frequency translate a desired communications channel from among the plurality of communications channels using a local oscillator signal to provide a translated communications channel;
    a low pass filtering module configured to remove noise or interference from the translated communications channel to provide a filtered communications channel; and
    an analog to digital converter (ADC) configured to convert the filtered communications channel from an analog representation to a digital representation to provide the second sequence of data.

3. The front end module of claim 2, wherein the main front end module further comprises:
    a local oscillator generator module configured to provide the local oscillator signal and to adjust the local oscillator signal in response to the communications receiver parameter.

4. The front end module of claim 2, wherein the low pass filtering module is further configured to adjust its frequency response in response to the communications receiver parameter.

5. The front end module of claim 1, wherein the plurality of communications channels are embedded within the communications signal.

6. The front end module of claim 1, wherein the parameter estimation module is further configured to estimate the plurality of signal metrics using a Fast Fourier Transform (FFT).

7. The front end module of claim 1, wherein the plurality of signal metrics comprise:
    a mean of the first sequence of data;
    a total energy of the first sequence of data;
    an average power of the first sequence of data;
    a mean square of the first sequence of data;
    an instantaneous power of the first sequence of data;
    a root mean square of the first sequence of data;
    a variance of the first sequence of data;

a norm of the first sequence of data;
a voltage level of the first sequence of data;
a phase offset between the first sequence of data and the second sequence of data;
a frequency offset between the first sequence of data and the second sequence of data; or
a timing offset between the first sequence of data and the second sequence of data.

8. The front end module of claim 1, wherein the statistical relationship comprises:
a mean;
a medium;
a maximum;
a minimum;
a correlation; or
an auto-correlation.

9. The front end module of claim 1, further comprising:
an amplifier module configured to amplify a received communications signal to provide the communications signal.

10. The front end module of claim 9, wherein the amplifier module is further configured to adjust its gain based on the communications receiver parameter.

11. The front end module of claim 1, wherein the front end module is coupled to a demodulator module, the demodulator module including an adaptive equalizer, the adaptive equalizer being configured to adjust its equalization coefficients based on the communications receiver parameter.

12. A method for determining an operational setting of a communications receiver, comprising:
determining a first sequence of data based on a communications signal, the communications signal including a plurality of communications channels, and the first sequence of data occupying a first group of communications channels from among the plurality of communications channels;
estimating a plurality of signal metrics of the plurality of communications channels;
determining a statistical relationship between the plurality of signal metrics; and
estimating, based on the statistical relationship and the first sequence of data, a communications receiver parameter; and
determining a second sequence of data in accordance with the communications receiver parameter based on the communications signal, the second sequence of data occupying a second group of communications channels from among the plurality of communications channels, wherein the second group of communications channels includes a fewer number of communications channels than the first group of communications channels.

13. The method of claim 12, wherein the plurality of communications channels are embedded within the communications signal, and wherein the determining the second sequence of data comprises:
frequency translating a desired communications channel from among the plurality of communications channels using a local oscillator signal to provide a translated communications channel;
removing noise or interference from the translated communications channel to provide a filtered communications channel; and
converting the filtered communications channel from an analog representation to a digital representation to provide the second sequence of data.

14. The method of claim 12, wherein the plurality of communications channels are embedded within the communications signal.

15. The method of claim 12, wherein the plurality of signal metrics comprise:
a mean of the first sequence of data;
a total energy of the first sequence of data;
an average power of the first sequence of data;
a mean square of the first sequence of data;
an instantaneous power of the first sequence of data;
a root mean square of the first sequence of data;
a variance of the first sequence of data;
a norm of the first sequence of data;
a voltage level of the first sequence of data;
a phase offset between the first sequence of data and the second sequence of data;
a frequency offset between the first sequence of data and the second sequence of data; or
a timing offset between the first sequence of data and the second sequence of data.

16. The method of claim 12, wherein the statistical relationship comprises:
a mean;
a medium;
a maximum;
a minimum;
a correlation; or
an auto-correlation.

17. The method of claim 12, further comprising:
amplifying a received communications signal to provide the communications signal.

18. The method of claim 17, further comprising:
adjusting a gain of an amplifier module based on the communications receiver parameter.

19. The method of claim 12, further comprising:
compensating for unwanted distortion impressed on the second sequence of data using an equalization coefficient, the equalization coefficient being based on the communications receiver parameter.

20. A front end module of a communications receiver, comprising:
an auxiliary front end module configured to:
receive a communications signal including a plurality of communications channels, and
provide a first sequence of data based on the communications signal, the first sequence of data occupying a first group of communications channels from among the plurality of communications channels;
a main front end module configured to:
receive the communications signal, and
provide a second sequence of data based on the communications signal, the second sequence of data occupying a second group of communications channels from among the plurality of communications channels, wherein the second group of communications channels includes a fewer number of communications channels than the first group of communications channels; and
a parameter estimation module configured to:
estimate a plurality of signal metrics of the plurality of communications channels,
determine a statistical relationship between the plurality of signal metrics, and
estimate, based on the statistical relationship and the first sequence of data, a communications receiver parameter, and initiate processing the first sequence of data and the second sequence of data based on the communications receiver parameter.

21. The front end module of claim 20, wherein the parameter estimation module is further configured to:
estimate the communications receiver parameter based on the second sequence of data.

22. The front end module of claim 20, further comprising:
a demodulator module, wherein the parameter estimation module is further configured to estimate the communications receiver parameter based on demodulator information communicated by the demodulator module.

23. The front end module of claim 20, wherein the parameter estimation module is further configured to:
estimate the communications receiver parameter based on a relationship between the first sequence of data and the second sequence of data.

24. The front end module of claim 20, wherein each signal metric in the plurality of signal metrics corresponds to each channel in the plurality of communications channels.

25. The front end module of claim 20, wherein the parameter estimation module is further configured to:
compare the plurality of signal metrics to determine the statistical relationship between the plurality of signal metrics.

26. The front end module of claim 20, wherein the statistical relationship comprises:
a mean;
a medium;
a maximum;
a minimum;
a correlation; or
an auto-correlation.

* * * * *